(12) United States Patent
Ishida et al.

(10) Patent No.: US 8,007,403 B2
(45) Date of Patent: Aug. 30, 2011

(54) WORK VEHICLE HAVING HYDRAULIC STEPLESS SPEED CHANGING APPARATUS

(75) Inventors: Yuuki Ishida, Nishinomiya (JP); Hiroshi Shimada, Nara (JP); Koji Nada, Sakai (JP); Masaru Nakaji, Sakai (JP); Hiroki Bessho, Sakai (JP); Masatake Murakawa, Osaka (JP); Yasunobu Nakatani, Sakai (JP)

(73) Assignee: Kubota Corporation, Osaka (JP)

( * ) Notice: Subject to any disclaimer, the term of this patent is extended or adjusted under 35 U.S.C. 154(b) by 541 days.

(21) Appl. No.: 12/204,336

(22) Filed: Sep. 4, 2008

(65) Prior Publication Data
US 2009/0239706 A1    Sep. 24, 2009

(30) Foreign Application Priority Data

Sep. 11, 2007  (JP) ................................. 2007-235665
Sep. 13, 2007  (JP) ................................. 2007-238083
Apr. 10, 2008  (JP) ................................. 2008-102471

(51) Int. Cl.
*F16H 61/40* (2010.01)
(52) U.S. Cl. ........................................................ 477/68
(58) Field of Classification Search .................. None
See application file for complete search history.

(56) References Cited

U.S. PATENT DOCUMENTS

| | | | | |
|---|---|---|---|---|
| 4,967,610 A | * | 11/1990 | Sasajima et al. | ............. 477/68 |
| 2004/0163490 A1 | | 8/2004 | Nakatani et al. | |
| 2007/0219047 A1 | | 9/2007 | Nakatani et al. | |

FOREIGN PATENT DOCUMENTS

| | | |
|---|---|---|
| JP | 2004-257447 | 9/2004 |
| JP | 2007-239978 | 9/2007 |

* cited by examiner

*Primary Examiner* — Dirk Wright
(74) *Attorney, Agent, or Firm* — The Webb Law Firm

(57) ABSTRACT

A work vehicle includes a hydraulic stepless speed changing apparatus and a gear type speed changing apparatus operable to receive output from the hydraulic stepless speed changing apparatus to convert it into a plurality of stages of speed. A return oil passage connected to a high-pressure side circuit of the hydraulic stepless speed changing apparatus is connected to a hydraulic tank. The return oil passage incorporates an unload valve and a throttle valve, between which an operably coupling mechanism is provided. This operably coupling mechanism switches over the unload valve to an unload condition in response to an operational displacement of a brake operating member for operating a brake to its braking side.

9 Claims, 23 Drawing Sheets

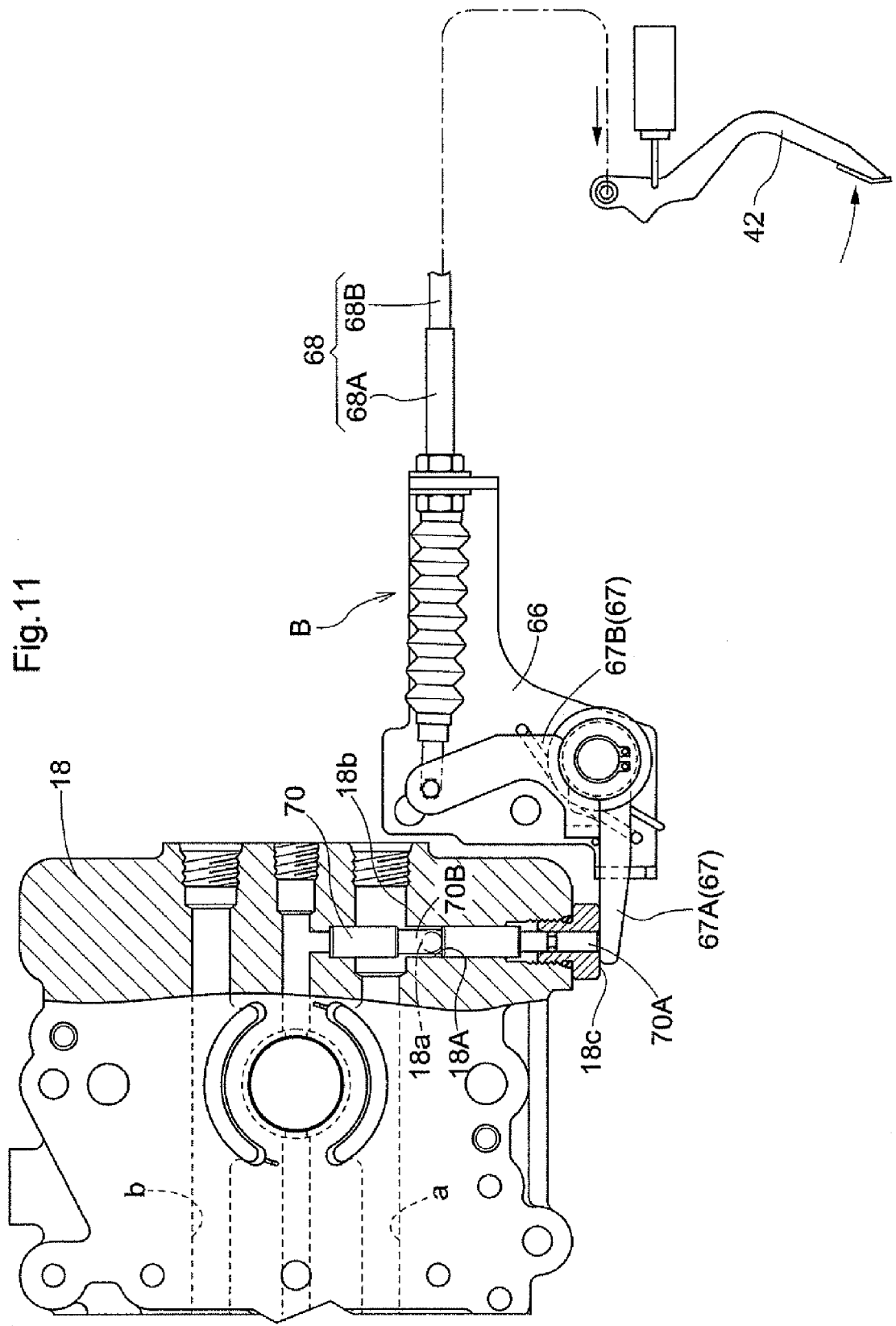

Fig.12A
Fig.12B
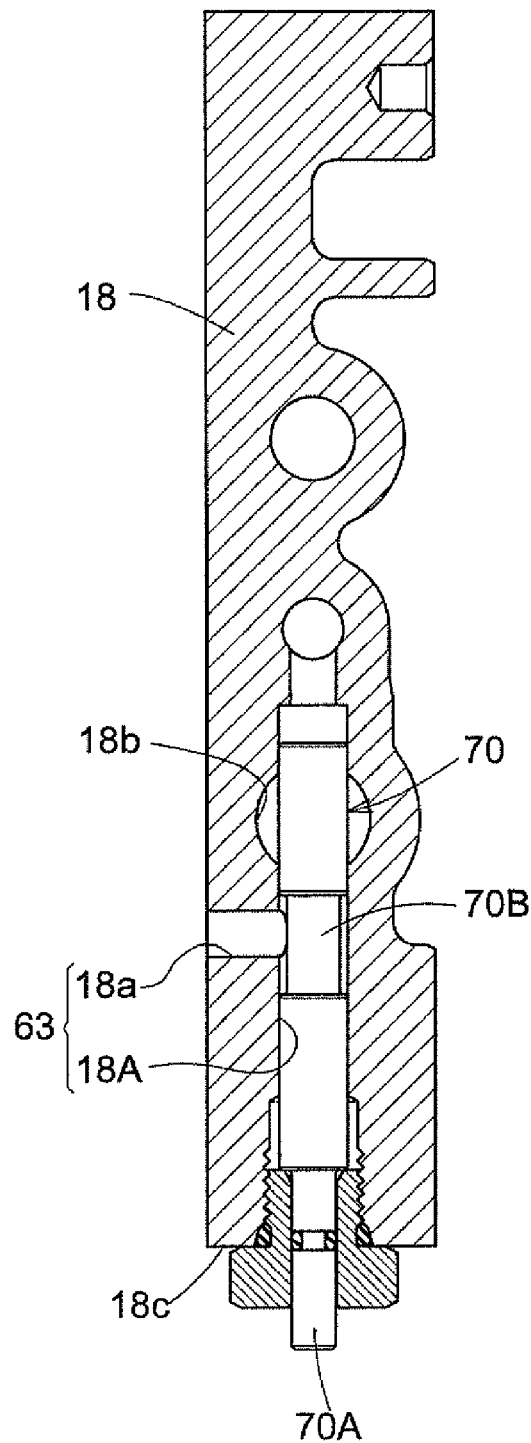
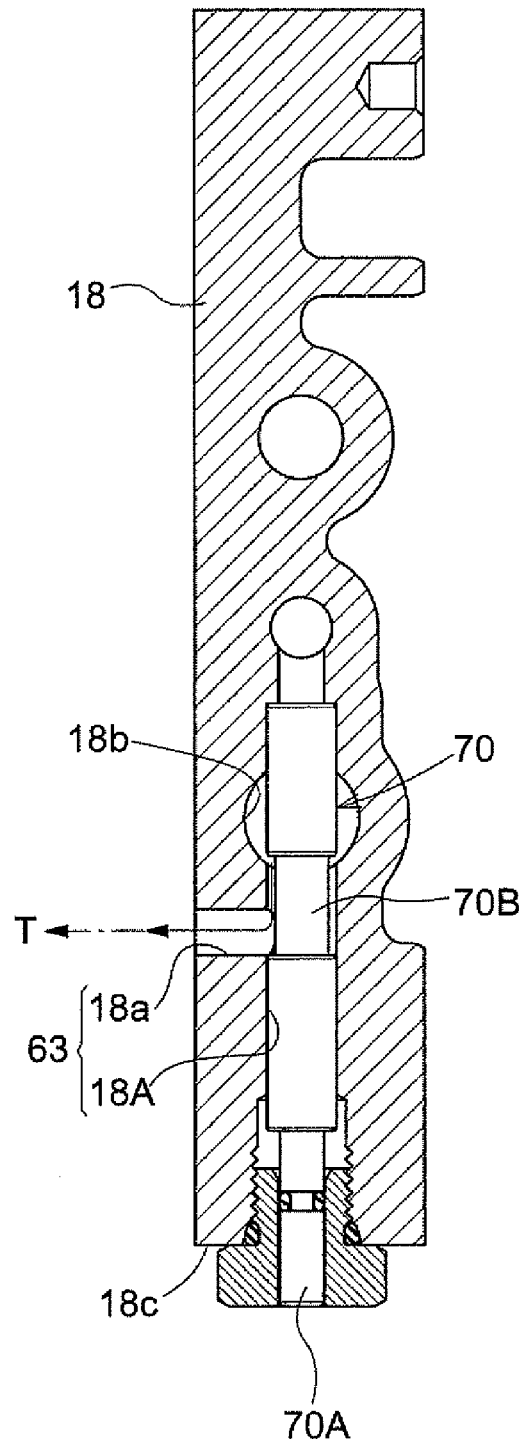

WORK VEHICLE HAVING HYDRAULIC STEPLESS SPEED CHANGING APPARATUS

BACKGROUND OF THE INVENTION

1. Field of the Invention

The present invention relates to a work vehicle having a hydraulic stepless speed changing apparatus and a gear type speed changing apparatus.

2. Description of the Related Art

From the Japanese Patent Application "Kokai" No. 2004-257447, there is known, as an example of the above-noted work vehicle, a multi-purpose work vehicle configured such that engine power is inputted to a main speed changing apparatus to be speed-changed in a stepless manner, and the resultant speed-changed power in a predetermined rotational direction is transmitted to a gear type auxiliary speed changing apparatus to be converted selectively into a forward driving power or a reverse driving power in plurality of stages of forward/reverse speeds, respectively. With this work vehicle, when the any speed changing apparatus is to be switched over, the speed changing operation is effected after a traveling brake is activated for braking. However, if the auxiliary speed changing operation is effected during e.g. a slope traveling when there is a significant pressure difference between the high pressure side oil passage and the low pressure side oil passage, a gear speed changing operation needs to be effected, with the torque from the main speed changing apparatus being applied to the auxiliary speed changing apparatus. Therefore, the shifting operation cannot sometimes be effected smoothly.

In an attempt to solve the above problem, in the Japanese Patent Application "Kokai" No. 2007-239978 (paragraphs [0032] to [0036], FIG. 8 to FIG. 10) assigned to the present applicant, there was proposed a technique as follows. In this, a bypass passage is formed between a high-pressure side circuit and a low-pressure side circuit of a hydrostatic stepless speed changing apparatus as a main speed changing apparatus. The bypass passage incorporates therein an opening/closing valve and a manual operating member is provided for switching over the opening/closing valve. However, with this conventional art, if bypass between the high-pressure side circuit and the low-pressure side circuit is established by an operation of the operating lever simultaneously with a stepping operation of the brake pedal to the braking side, the torque of the hydrostatic stepless speed changing apparatus is released all at one time, thus resulting in sudden release of the torque of the hydrostatic stepless speed changing apparatus This release of torque results in sudden release of the braking function of the hydrostatic stepless speed changing apparatus. As a result, the work vehicle becomes unstable until complete application of a braking force on the slope or the like.

SUMMARY OF THE INVENTION

The object of the present invention is to provide a work vehicle which is reliable and stable while allowing a smooth switchover operation of the gear type auxiliary speed changing apparatus, by adopting an arrangement for preventing sudden release of torque of the hydraulic stepless speed changing apparatus.

For accomplishing the above-noted object, a work vehicle having a hydraulic stepless speed changing apparatus, according to one aspect of the present invention, comprises:

a gear type speed changing apparatus receiving an output from the hydraulic stepless speed changing apparatus and converting it into a plurality of stages;

a return oil passage connected to a high-pressure side circuit of the hydraulic stepless speed changing apparatus, the return oil passage being in communication with a hydraulic tank;

an unload valve and a throttle valve which are incorporated in said return oil passage;

a brake operating member for operating a brake; and an operably coupling mechanism for switching over said unload valve to an unloading condition, in response to an operational displacement of said brake operating member to its braking side, the operably coupling mechanism being provided between said unload valve and said brake operating member.

With the above construction, when the brake operating member is operated to the braking side, the brake is rendered into its braking state and at the same time the unload valve is released to guide high-pressure work oil from the high-pressure side circuit to the hydraulic tank via the return oil passage, thus releasing a high-pressure condition. With this, the drive torque being applied to the gear type auxiliary speed changing apparatus is released, so that a speed changing operation may be effected smoothly. Moreover, as the throttle valve functions to restrict sudden transport of the high-pressure work oil guided from the high-pressure side circuit to the hydraulic tank, but the valve allows gradual guidance thereof, there occurs no sudden release of the torque of the stepless hydrostatic speed changing apparatus. With this, as the torque in the stepless hydrostatic speed changing apparatus is maintained at least temporarily, it is possible to maintain resistance against inadvertent movement of the work vehicle. Consequently, by effecting a braking operation which is unavoidably required for a shifting operation on the auxiliary speed changing apparatus, the release of the torque of the hydraulic stepless speed changing apparatus can proceed gradually. Hence, as compared with the conventional construction which requires both a braking operation and a bypass opening operation, the operation of the inventive construction is easier.

For accomplishing the above-noted object, according to another aspect of the present invention, there is proposed a work vehicle having a hydraulic stepless speed changing apparatus, the vehicle comprising:

a gear type speed changing apparatus receiving an output from the hydraulic stepless speed changing apparatus and converting it into a plurality of stages;

a return oil passage connected to a high-pressure side circuit of the hydraulic stepless speed changing apparatus, the return oil passage being in communication with a hydraulic tank;

an unload valve and a throttle valve which are incorporated in said return oil passage;

a brake operating member for operating a brake;

a manual operating member separate from said brake operating member; and an operably coupling mechanism for switching over said unload valve to an unloading condition, in response to an operational displacement of said manual operating member, the operably coupling mechanism being provided between said unload valve and said manual operating member.

With the above construction, when the manual operating member, more particularly, an auxiliary speed changing member for an auxiliary speed changing apparatus in one preferred embodiment, is operated, the unload valve is released to guide high-pressure work oil from the high-pressure side circuit to the hydraulic tank via the return oil passage, thus releasing a high-pressure condition. With this, the drive torque being applied to the gear type auxiliary speed changing apparatus is released, so that a speed changing operation may be effected smoothly. Moreover, as the throttle valve does not allow sudden transport of the high-pressure work oil guided from the high-pressure side circuit to the hydraulic tank, but allows gradual guidance thereof, there occurs no sudden release of the torque of the stepless hydrostatic speed changing apparatus. With this, as the torque in the stepless hydrostatic speed changing apparatus is maintained at least temporarily, it is possible to maintain resistance against inadvertent movement of the work vehicle. Hence, the release of the torque of the hydraulic stepless speed changing apparatus can be effected in response to an operation on the manual operating member. This allows various workshop designing of the operating system for switching over the unload valve, thus making it easy to simplify the construction for operable coupling with the unload valve.

Further and other features and advantages of the present invention will become apparent upon reading the following detailed description of embodiments with reference to accompanying drawings.

BRIEF DESCRIPTION OF THE DRAWINGS

FIG. 11 is a side view in vertical section showing the operably coupling mechanism between the brake operating member and the unload valve, the view illustrating a condition after the operation of the unload valve, FIG. 12A is a detailed view corresponding to FIG. 9, being a rear view in vertical section illustrating a condition before a spool of the unload valve is pushed in, FIG. 12B is a detailed view corresponding to FIG. 10, being a rear view in vertical section illustrating a condition after the spool of the unload valve has been pushed in.

DETAILED DESCRIPTION OF THE PREFERRED EMBODIMENTS

[General Construction of Work Vehicle]

Figure 1:
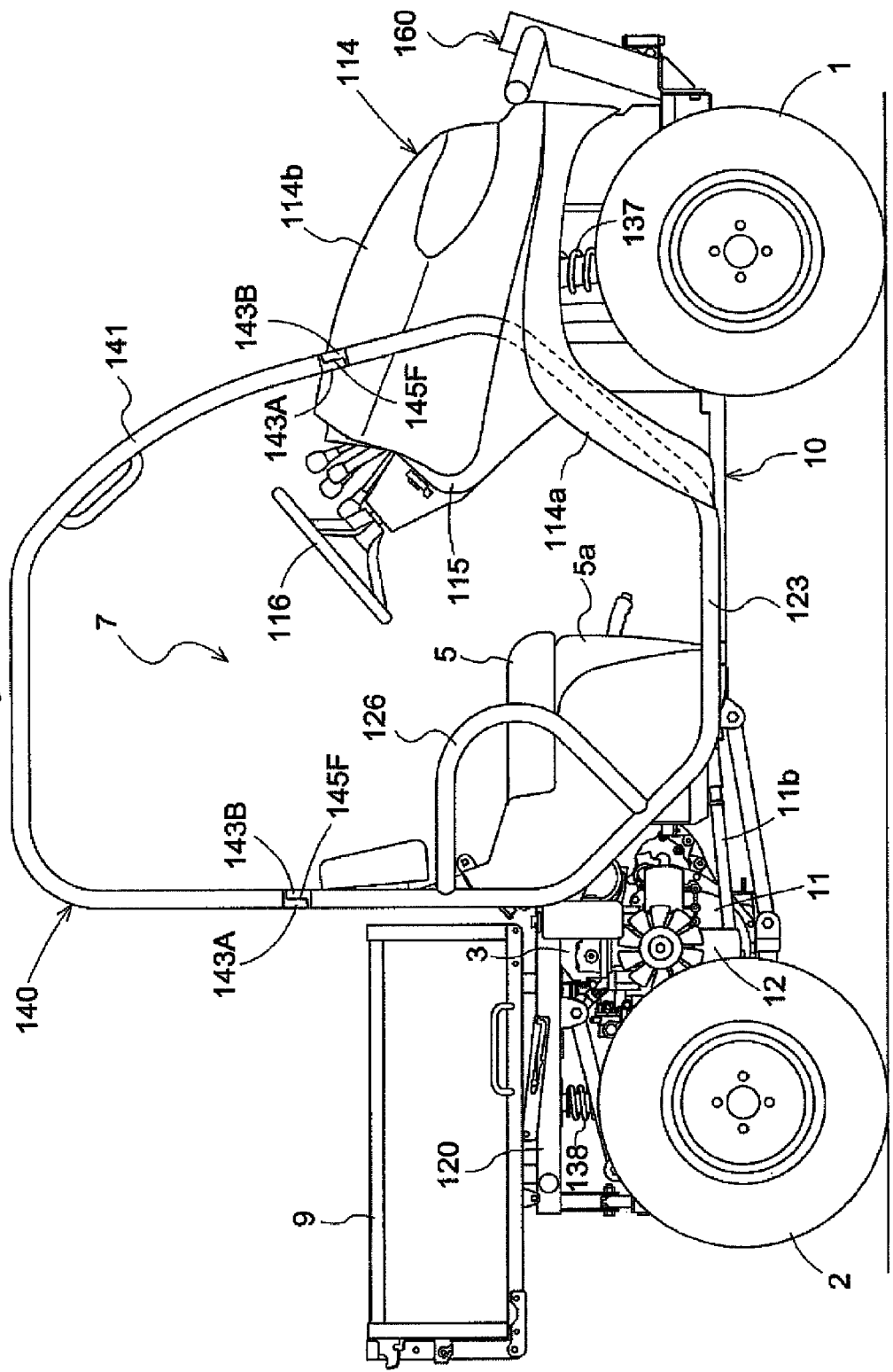
FIG. 1 is an overall side view of a work vehicle.
Figure 2:
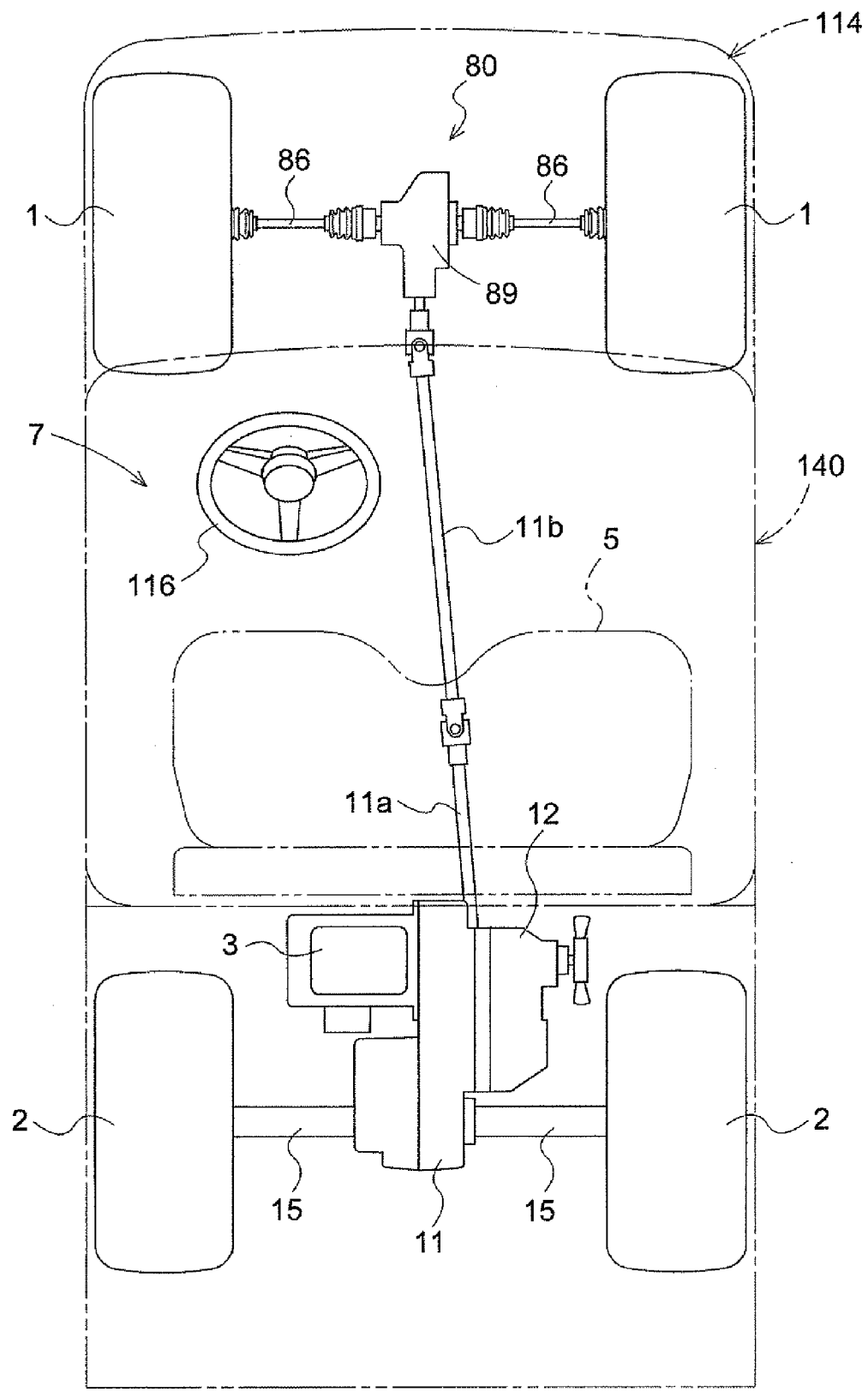
FIG. 2 is an overall plan view illustrating a transmission construction of the work vehicle.

With reference to FIG. 1 and FIG. 2, there will be explained a general construction of a work vehicle relating to the present invention. FIG. 1 is an overall right side view of the work vehicle. FIG. 2 is an overall plan view for explaining a transmission construction of the work vehicle. As shown in FIG. 1 and FIG. 2, the work vehicle includes steerable right and left front wheels 1 supported to front portions of a vehicle body frame 10, and non-steerable right and left rear wheels 2 supported to rear portions of the vehicle body frame 10. Hence, the vehicle is configured as a four-wheel drive vehicle. At an fore/aft intermediate portion of the work vehicle, there is provided a driving section 7 for two passengers. And, rearwardly of this driving section 7, there is provided a rear load mount section having a loading platform 9 capable of dumping actions.

A seat supporting panel 5a is mounted in such a manner as to cover an upper portion, a front portion and right and left side portions of a seat supporting frame extending erect from a fore/aft center portion of the vehicle body frame 10, and to the upper face of this seat supporting panel 5a, there is mounted and fixed a driver's seat 5. To an upper face of a main frame 120 disposed at the position of the driving section 7, a deck plate 18 is fixed, thereby to form a floor face of the driving section 7 (see FIG. 3).

At a front portion of the work vehicle, there is attached a front cover 114. This front cover 114 consists of a lower cover 114a for covering the front portion of the work vehicle from its front and lateral sides, and an upper cover 114b for covering the front portion of the work vehicle from its upper side. To a rear portion of the front cover 114, there is attached a control panel 115 covering the front face side of the driving section 7. And, from the left side of this control panel 115, there is extended a steering wheel 116 for steering the front wheels 1.

To an upper portion of the vehicle body frame 10, there are detachably attached right and left side ROPS (Roll Over Protection System) members 141 which will be described later. And, between and across these right and left side ROPS members 141, there are detachably attached front and rear upper transverse ROPS members 142, thereby constituting a ROPS 140. To upper portions of the side ROPS members 141 and the upper transverse ROPS members 142, roof members (not shown) are attached from the above. With this, the space upwardly of the passengers' space formed in the driving section 7 is covered by these roof members.

At a rear lower portion of the vehicle body frame 10, there is mounted a transmission case 11. To the left side of this transmission case 11, there is coupled an engine 9 as a driving source of the work vehicle. To the right side of the transmission case 11, there is coupled a hydrostatic stepless speed changing apparatus (HST) 12. With these in operation, the power from the engine 9 is transmitted via the transmission case 11 to the hydrostatic stepless speed changing apparatus 12 and the power steed-changed steplessly by this hydrostatic stepless speed changing apparatus 12 is transmitted via the transmission case 11 to the right and left rear drive shafts 15 to rotatably drive the right and left rear wheels 2.

From the transmission case 11, a front wheel drive shaft 11*a* extends forwardly. And, to this front wheel drive shaft 11*a*, front wheel differential mechanisms 89 are operably coupled via a drive shaft 11*b* having universal joints at opposed ends thereof. With these components in operation, the power from the engine 9 is transmitted via the hydrostatic stepless speed changing apparatus 12 and the transmission case 11 to the front wheel differential mechanisms 89 and the right and left front wheels 1 are rotatably driven via right and left transmission shafts 86.

To the lateral face of the front end portion of the transmission case 11 disposed between the front and rear wheels 1, 2, an engine 3 is mounted. And, on the opposite side of the transmission case 11 to the side the engine 3 is attached, there is mounted the hydrostatic stepless speed changing apparatus 12 as a main speed changing apparatus, which receives the output from the engine 3 and effects stepless speed change on it, so that this speed-changed output is outputted to an auxiliary speed changing apparatus 13. The auxiliary speed changing apparatus 13 is capable of speed changing operations in two stages in the forward direction and in one stage in the reverse direction.

The output from the auxiliary speed changing apparatus 13 is transmitted via rear wheel differential mechanisms 14 to right and left axles 15 to be used for driving the rear wheels.

Figure 3:
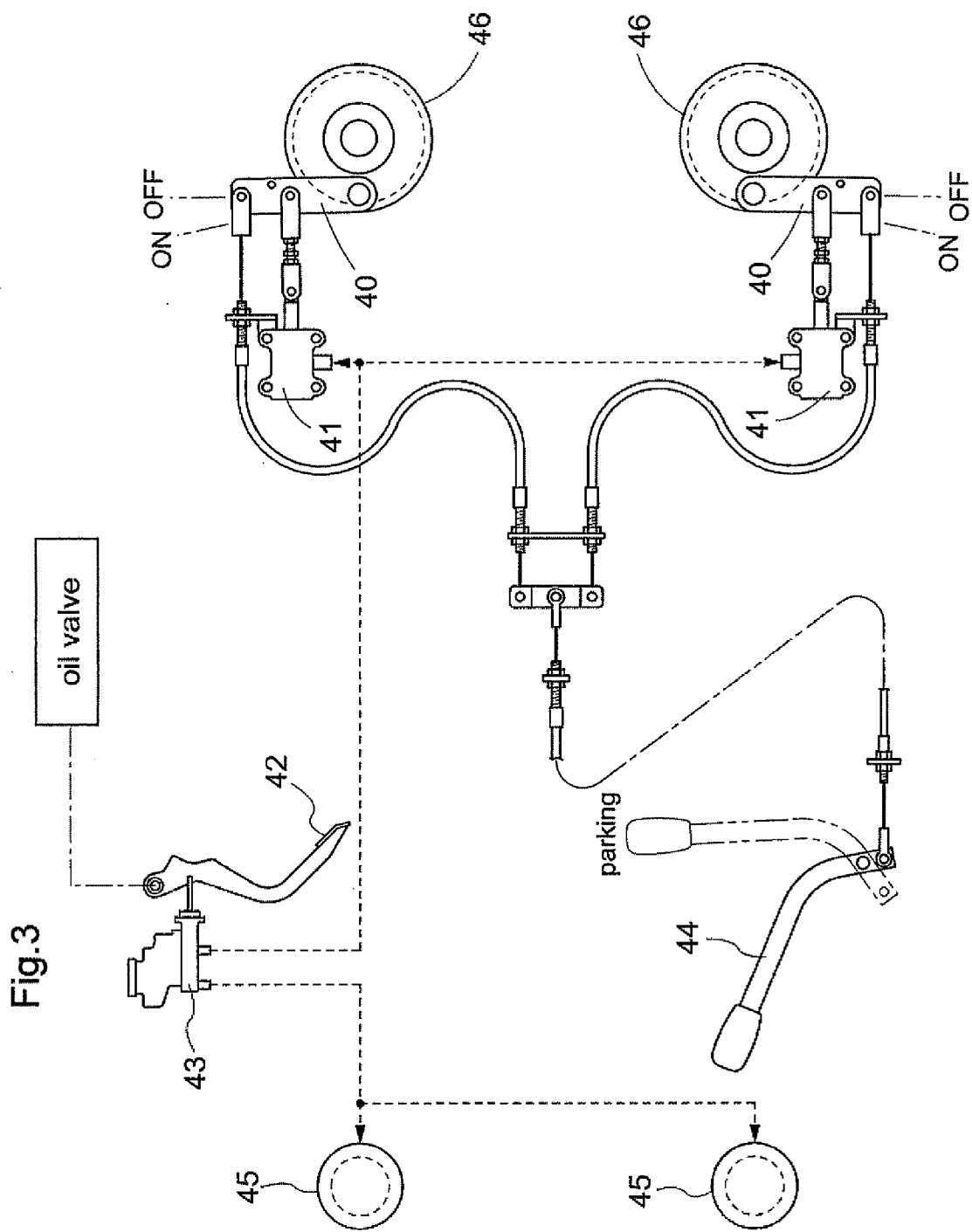
FIG. 3 is a diagram showing a brake operating construction.

The transmission line to the front wheels 1 and the transmission line to the rear wheels 2 incorporate multiple-disc type brakes 45, 46 respectively. As shown in FIG. 3, the front wheel brake 45 is configured so that a group of friction plates are pressed against each other in response to a displacement of an incorporated piston (not shown) by a hydraulic operation. The rear wheel brake 46 is configured so that a group of friction plates are pressed against each other in response to a pivotal displacement of an incorporated cam (not shown) by a pivotal operation of a brake operating lever 40 with an operating cylinder 41. The front wheel brake 45 and the operating cylinder 41 are pipe-connected to a master cylinder 43 operable by a brake pedal 42 disposed at the foot of the driving section 7. In operation, when the brake pedal 42 is stepped on to feed pressure oil from the master cylinder 43, the front wheel brake 45 effects a braking operation according to the operated oil pressure and also the operating cylinder 41 is retracted to cause the rear wheel brake 46 to effect a braking operation according to the operated oil pressure. When the stepping operation on the brake pedal 42 is released, the operational oil pressure is removed, so that each brake 45, 46 is returned to the braking released condition.

Figure 4:
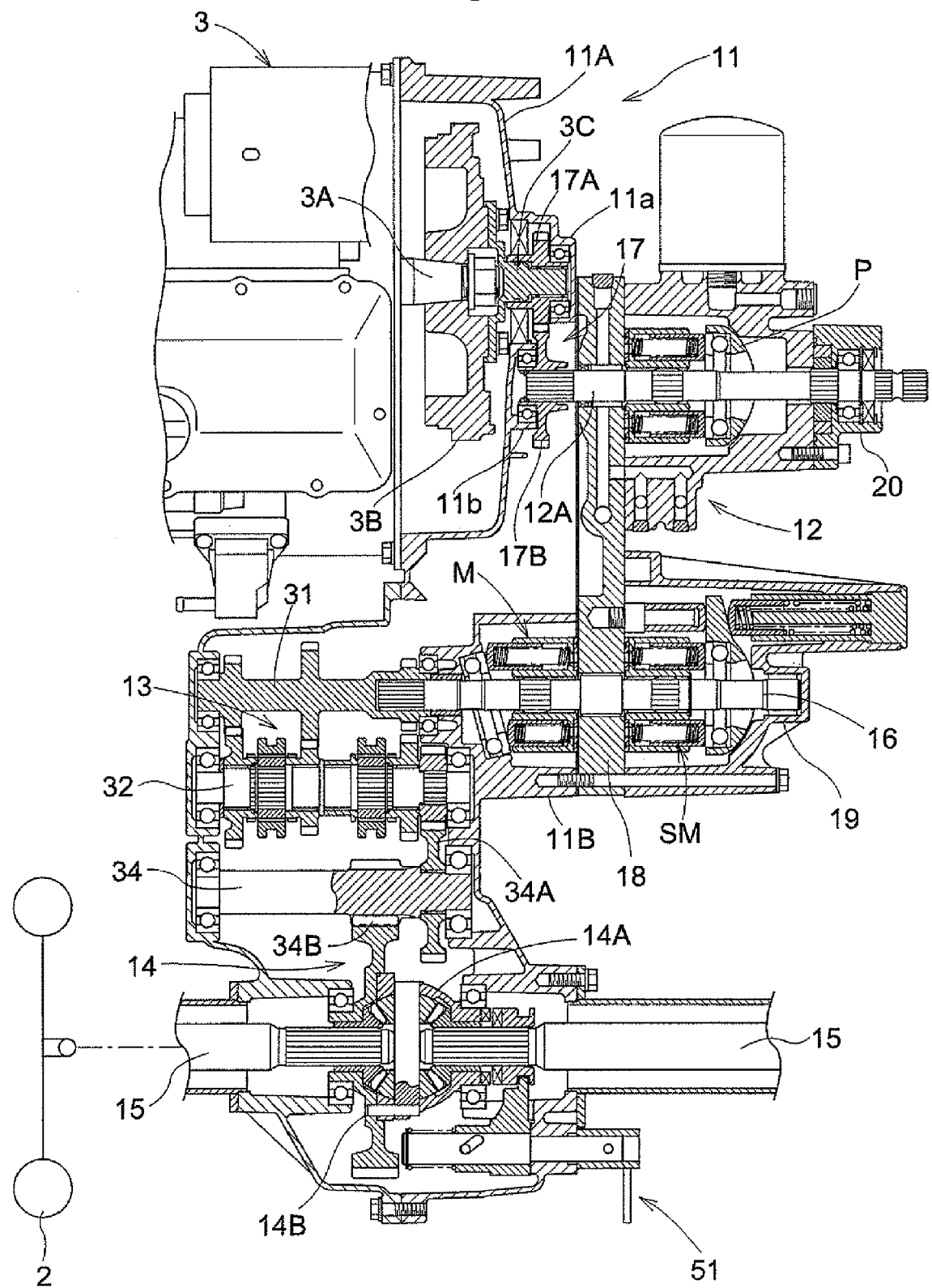
FIG. 4 is a rear view in vertical section showing the transmission construction.
Figure 5:
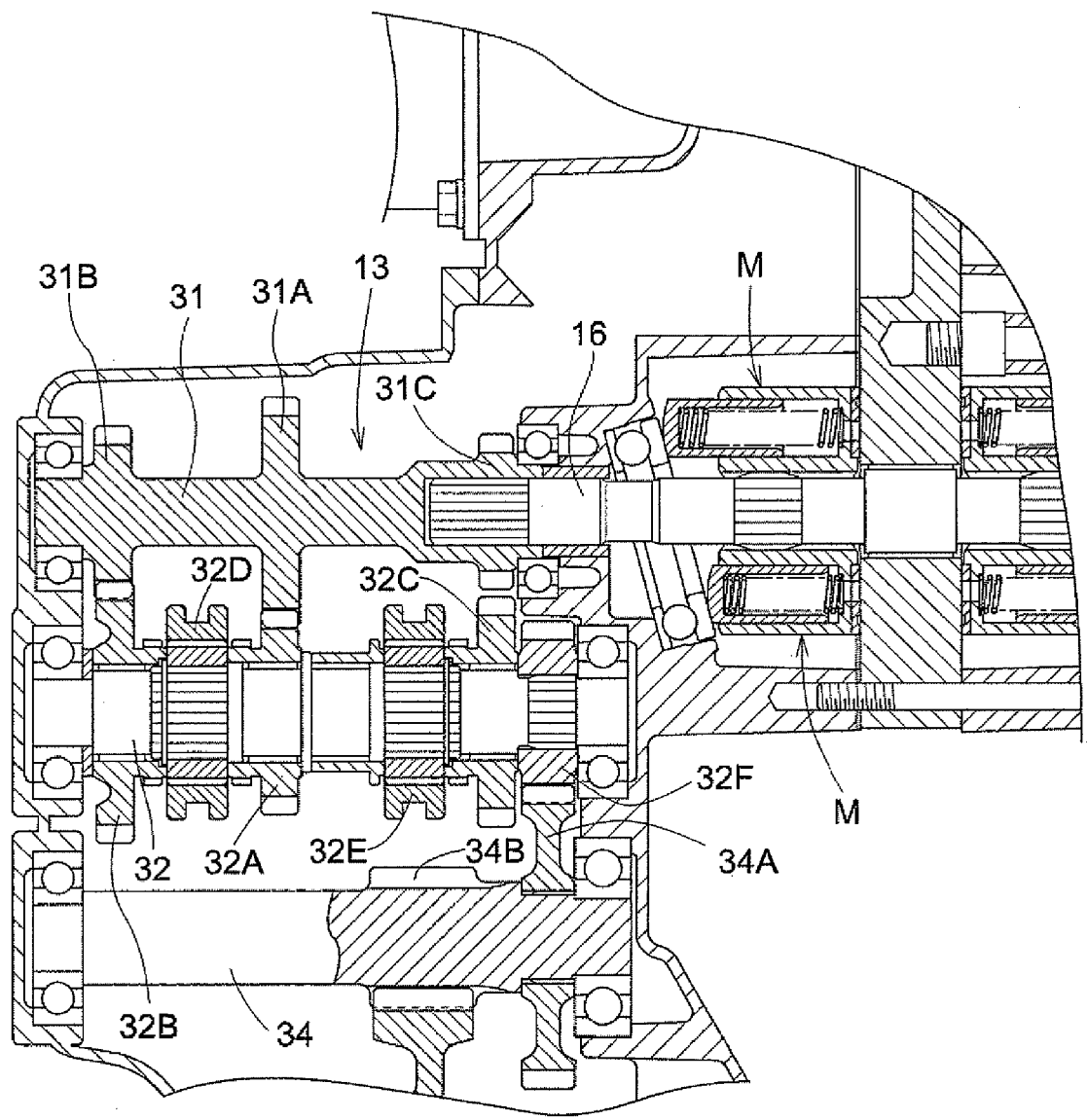
FIG. 5 is a rear view in section showing an auxiliary speed changing apparatus.

Incidentally, the brake operating lever 40 is wire-connected to a parking lever 44 provided at the driving section 7. In operation, when the parking lever 44 is operated to and retained at a "PARKING" position, only the brakes 39 for the right and left rear wheels 2 are braked to effect a parking operation Next, there will be explained a transmission arrangement from the engine 3 to the hydrostatic stepless speed changing apparatus 12. As shown in FIG. 4 and FIG. 5, a first output shaft 3A of the engine 3 mounts a flywheel 3B, from which a second output shaft 3C extends. Between this second output shaft 3C and an input shaft 12A of the hydrostatic stepless speed changing apparatus 12, there is provided a first gear transmission mechanism 17. The flywheel 3B and the first and second output shafts 3A, 3C are disposed inside an output case 11A to which the engine 3 is operably coupled. The output case 11A includes a projecting portion 11*a* projecting toward the hydrostatic stepless speed changing apparatus 12, the projecting portion 11*a* mounting an output gear 17A of the first gear transmission mechanism 17.

More particularly, as shown in FIG. 4, the output gear 17A as being mounted on the second output shaft 3C is rotatably supported inside the projecting portion 11*a* via a bearing. Adjacent the projecting portion 11*a* of the output case 11A, the output case 11A further includes an outward boss portion 11*b*, which mounts, via a bearing, an input gear 17B of the first gear transmission mechanism 17. This input gear 17B is mounted on an input shaft 12A extending from the hydrostatic stepless speed changing apparatus 12 to transmit the engine power to the hydrostatic stepless speed changing apparatus 12.

Next, the construction of the hydrostatic stepless speed changing apparatus 12 will be explained. As shown in FIG. 4, this hydrostatic stepless speed changing apparatus 12 includes a main hydraulic motor M, an auxiliary hydraulic motor SM and a hydraulic pump P for feeding pressure oil to these motors M, SM. The main hydraulic motor M is accommodated within a boss portion 11B projecting outwardly from one lateral face of the transmission motor 11. The auxiliary hydraulic motor SM is accommodated within a motor case 19 fixedly attached via a hydraulic port block 18 attached in a manner to close an open end of the boss portion 11B accommodating the main hydraulic motor M. The hydraulic pump P is fixedly attached to a pump case 20 fixedly attached to the hydraulic port block 18 together with the motor case 19.

The hydraulic pump is an axial plunger type variable displacement pump and the main hydraulic motor M is an axial plunger type fixed displacement motor. The auxiliary hydraulic motor SM is an axial plunger type variable displacement motor. The hydraulic pump P is mounted on the input shaft 12A which extends through the hydraulic port block 18 to reach the output case 11A. The main and auxiliary hydraulic motors M, SM are mounted on a common output shaft 16 to the auxiliary speed changing apparatus 13.

Next, the auxiliary speed changing apparatus 13 will be explained. As shown in FIG. 4 and FIG. 5, an input shaft 31 of the auxiliary speed changing apparatus 13 is supported inside the transmission case 11 and the input shaft 31 is arranged coaxially with the common output shaft 16. An axial end of the common output shaft 16 is engaged and splined into an axial end of the input shaft 31, so that the power is supplied from the hydraulic stepless speed changing apparatus 12 to the input shaft 31. The input shaft 31 includes a high-seed large gear portion 31A, a low-speed small gear portion 31B, and a reverse traveling gear portion 31C formed integrally thereon.

A first transmission shaft 32 is mounted parallel with the input shaft 31. On this first transmission shaft 32, there are loosely and rotatably mounted a small input gear 32A constantly meshed with the large gear portion 3S formed on the input shaft 31 and a large input gear 32B constantly meshed with the small gear portion 31B formed on the input shaft 31 and a reverse traveling input gear 32C. Between the small input gear 32A and the large input gear 32B and between the large input gear 32B and the reverse traveling input gear 32C, there are provided first and second clutch sleeves 32D, 32E which are switched over in the synchromesh manner. When the first clutch sleeve 32D is engaged with the small input gear 32A, forward second speed power can be introduced from the forward second-speed large gear portion 31A. When the first clutch sleeve 32D is engaged with the large input gear portion 33A, a forward first-speed power can be introduced from the forward first-speed small gear 32A. When the second clutch sleeve 32E is engaged with the reverse traveling input gear 32, a reverse traveling power can be taken off.

Figure 6:
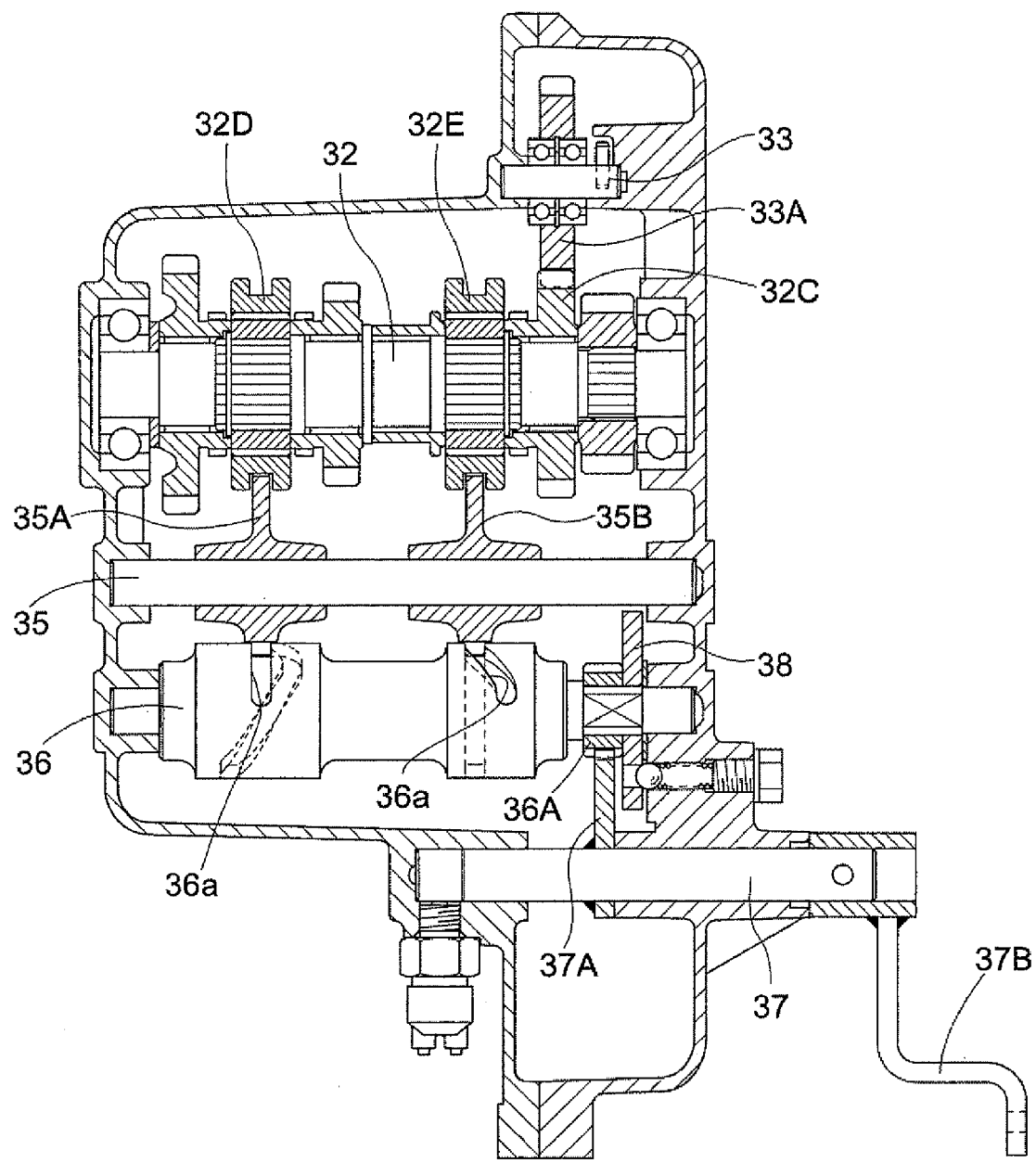
FIG. 6 is a plan view in horizontal section showing a speed changing operating construction of the auxiliary speed changing apparatus, FIG. 7 a side view showing a positioning mechanism of the auxiliary speed changing apparatus.

As shown in FIG. 4, FIG. 5 and FIG. 6, a reverse traveling shaft 33 is mounted parallel with the first transmission shaft 32 inside the transmission case 11 and on this reverse traveling shaft 33, a reverse gear 33A is mounted via a bearing. Then, when this reverse gear 33A is engaged with the reverse traveling input gear 32C and the reverse gear portion 31C of the input shaft 31, the reverse traveling output is transmitted.

Between the first transmission shaft 32 and the axle 15, a second transmission shaft 34 is mounted parallel therewith, and the second transmission shaft 34 loosely mounts a large transmission gear 34A and a small output gear portion 34B is integrally formed adjacent to this transmission gear 34A. An output gear 32F is splined on the first transmission shaft 32. And, as this output gear 32F is constantly meshed with the transmission gear 34A of the second transmission shaft 34, power can be transmitted from the first transmission shaft 32 to the second transmission shaft 34.

At positions in abutment against the right and left axles 15, 15, there are provided the rear differential mechanisms 14. As an input gear 14B integrally mounted to a differential case 14A of the rear differential mechanism 14 is constantly meshed with the small output gear portion 34B of the second transmission shaft 34, power is transmitted from the second transmission shaft 34 to the axle 15. Numeral 51 in FIG. 2 denotes a differential lock member.

Next, the speed change operating arrangement of the auxiliary speed changing apparatus 13 will be explained. As shown in FIG. 5 and FIG. 6, a rotation operating shaft 35 is mounted parallel with the first transmission shaft 32 and a drum operating shaft 36 is mounted parallel with the rotation operating shaft 35. Further, a coupling operating shaft 37 is provided for operating this drum operating shaft 36. The rotation operating shaft 35 mounts thereon a first shifter 35A and a second shifter 35B which are engaged respectively with the first clutch sleeve 33D and the second clutch sleeve 32E.

The drum operating shaft 36 defines, in its outer peripheral face, spiral grooves 36a at two positions along the axial direction and in these spiral grooves, 36a, the first shifter 35A and the second shifter 35B are engaged respectively. On the other hand, the first shifter 35A and the second shifter 35B are mounted to be slidable along the axis of the drum operating shaft 36, but non-rotatable.

Figure 7:
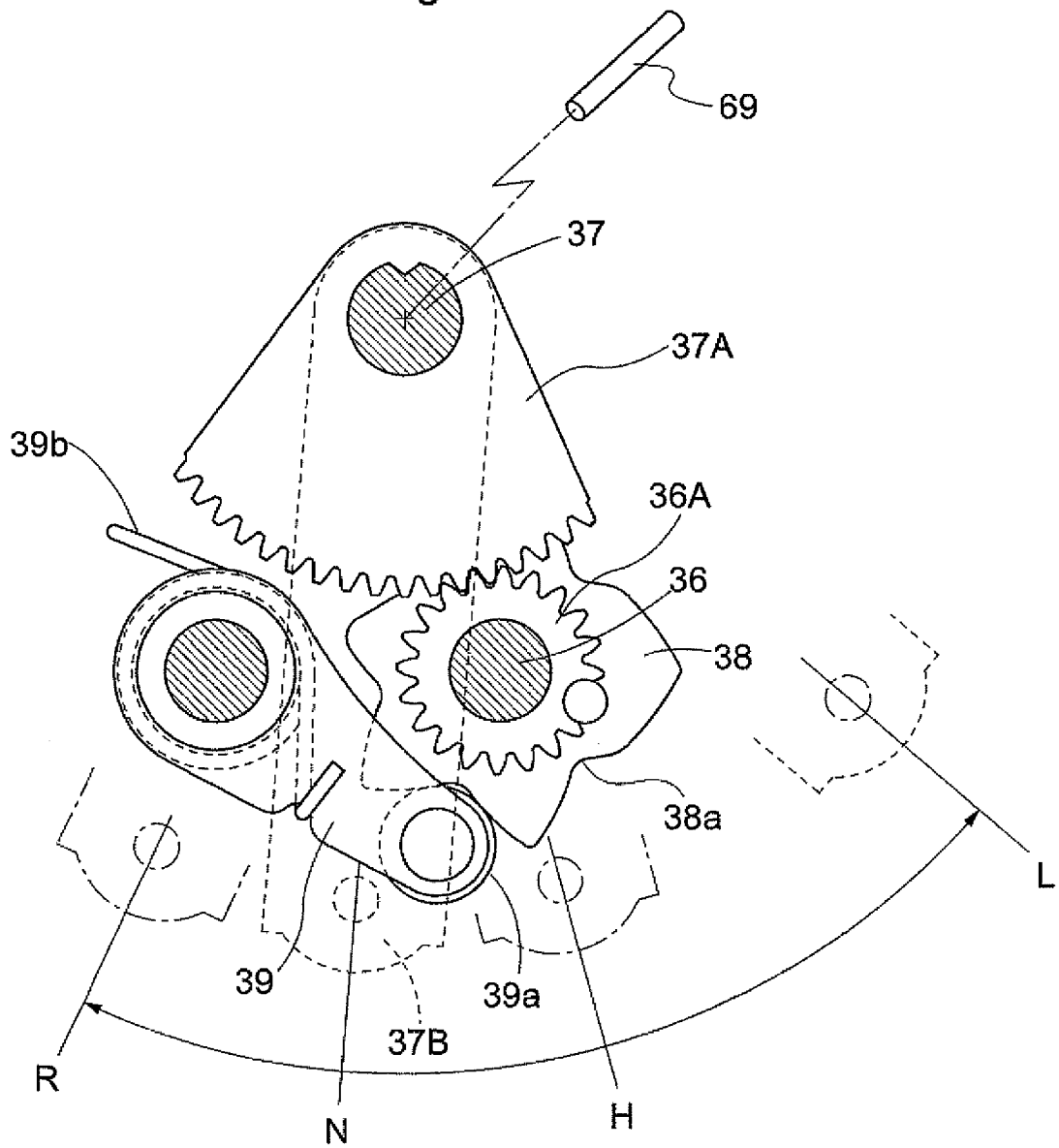

The coupling operating shaft 37 is operably coupled with an auxiliary speed change operating lever 69 as an auxiliary speed change operating member. As shown in FIG. 6 and FIG. 7, the coupling operating shaft 37 fixedly mounts a fan-shaped drive gear 37A. On the other hand, on the drum operating shaft 36, a driven gear 36A meshed with the fan-shaped drive gear 37A is mounted to be rotatable in unison therewith. In operation, when the coupling operating shaft 37 is driven to rotate about its own axis, the fans-shaped drive gear 37A is rotated and the driven gear 36A is rotated thereby to rotate the drum operating shaft 36. When the drum operating shaft 36 is rotated, the first shifter 35A and the second shifter 35B engaged respectively with the spiral grooves 36a are driven to move along the direction of the axis of the rotation operating shaft 35.

When the first shifter 35A and the second shifter 35B are driven to be moved, there is provided a condition where the clutch sleeves 32D, 32E engaged with the respective shifters 35A, 35B mesh with the large input gear 32A, the small input gear 32B and the reverse input gear 32C, whereby the auxiliary speed changing apparatus 13 becomes operable for a speed changing operation.

More particularly, as shown in FIG. 6 and FIG. 7, when an output arm 37B fixedly attached to the coupling operating shaft 37 is set to an operational position for reverse traveling (r) closer to the engine 3, the second shifter 35B is slid to bring the second clutch sleeve 32E into engagement with the reverse input gear 32C, thus realizing a reverse traveling condition. As the output arm 37B is operated away from the engine 3, a neutral (n), highs-speed (h) and low-speed (L) can be provided selectively.

Next, there will be explained a mechanism for fixing a speed changing operational position of the auxiliary speed changing apparatus 13. As shown in FIG. 6 and FIG. 7, on the drum operating shaft 36, a star-shaped positioning gear 38 is fixedly mounted to be rotatable in unison therewith, and a pivoting arm 39 is attached to the rotation operating shaft 35 and a cam follower 39a is attached to the leading end of the pivoting arm 39. As a cam follower 39a comes into engagement with a recess 38a defined in the outer peripheral face of the positioning gear 38, a speed changing operational position can be fixed. The pivoting arm 39 is urged in the engaging direction by means of a torsion spring 39b.

Figure 8:
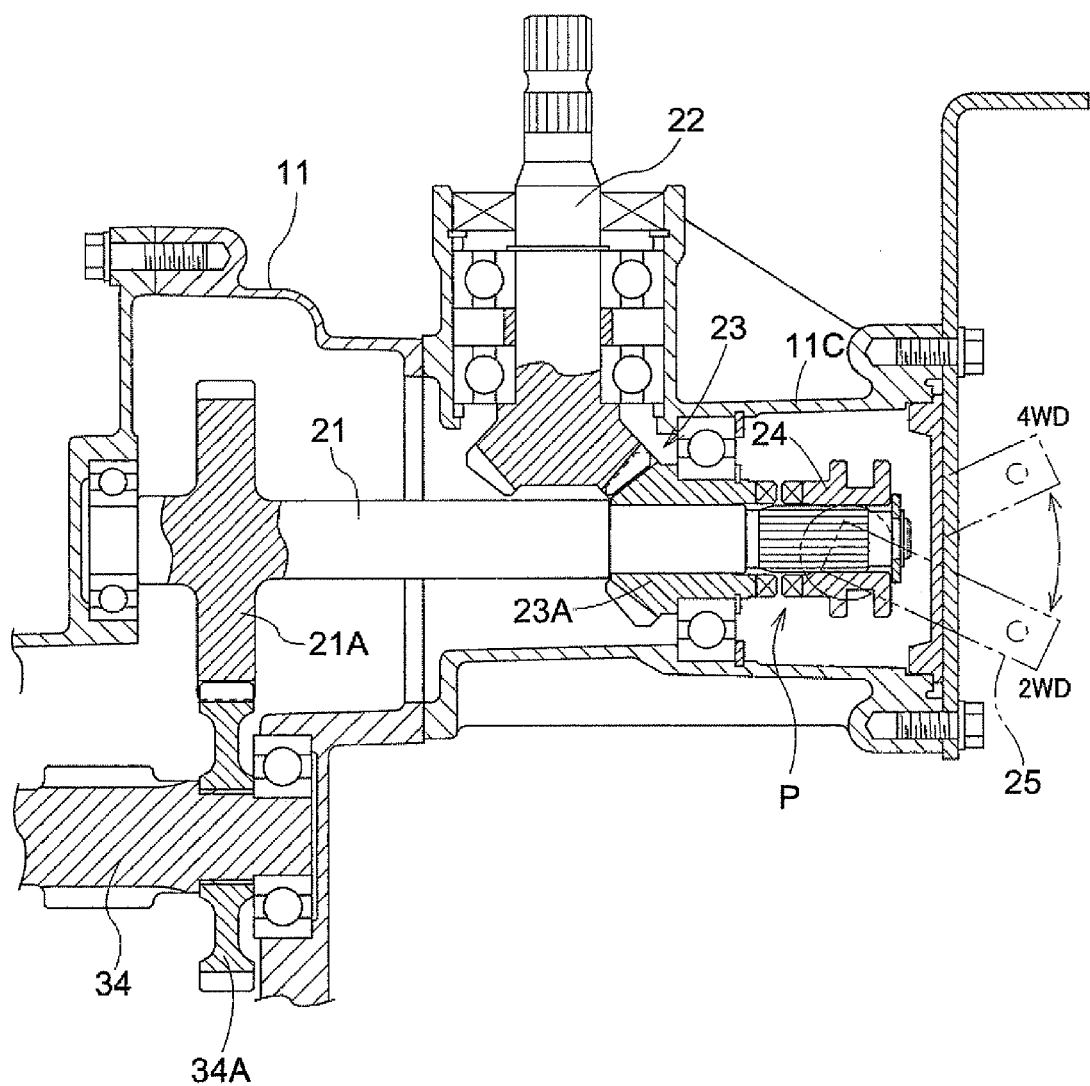
FIG. 8 is a plan view in horizontal section showing an output shaft to front wheels, the shaft being housed in a transmission case.

Next, there will be explained a transmission line to the front wheels 1. As shown in FIG. 4 and FIG. 8, on the side of the transmission case 11 opposite to its engine connecting portion, a front wheel transmission shaft 21 is mounted laterally inside a front case 11C. This front wheel transmission shaft 21 is mounted parallel with the second transmission shaft 34. A transmission gear 34A is fixedly mounted on an end of the second transmission shaft 34 to be rotatable in unison therewith. And, the front wheel transmission shaft 21 integrally forms an input gear portion 21A. As the transmission gear 34A and the input gear portion 21A are constantly meshed with each other, power can be transmitted from the first transmission shaft 34 to the front wheel transmission shaft 21.

Inside the front case 11C, there is projected a front wheel output shaft 22 oriented along the fore/aft direction. And, at the intersection between the axial line of the front wheel output shaft 22 and the axial line of the front wheel transmission shaft 21, there is provided a bevel gear transmission mechanism 23, so that power can be transmitted via this bevel gear transmission mechanism 23 to the front wheel output shaft 22. The power transmitted to the front wheel output shaft 22 is then transmitted to the front wheels 1 via an un-illustrated propeller shaft.

As shown in FIG. 4 and FIG. 8, an output bevel gear 23A disposed at an end of the front wheel transmission shaft 21 in the bevel gear transmission mechanism 23 is loosely mounted on this front wheel transmission shaft 21. On an end portion of the front wheel transmission shaft 21 adjacent the output bevel gear 23A, a clutch sleeve 24 is splined. And, at mutually opposing faces of this clutch sleeve 24 and the output bevel gear 23A, there is provided a pawl-engagement type dog clutch P. When pawls of this dog clutch are brought into engagement, power can be transmitted to the front wheels 1, thereby allowing four-wheel traveling with the front and rear wheels 1, 2. On the other hand, when the pawls are disengaged from each other, the power transmission to the font wheels 1 is broken, thus providing two-wheel traveling with the rear wheels 2 alone engaged in driving operation.

An operating arm 25 for switching over the clutch sleeve 24 between a clutch engaged condition and a clutch disengaged condition is pivotally attached to the front case 11C. This operating arm 25 is operably coupled with an unillustrated 4wd/2wd switching member to be operable by a driver's hand.

Figure 9:
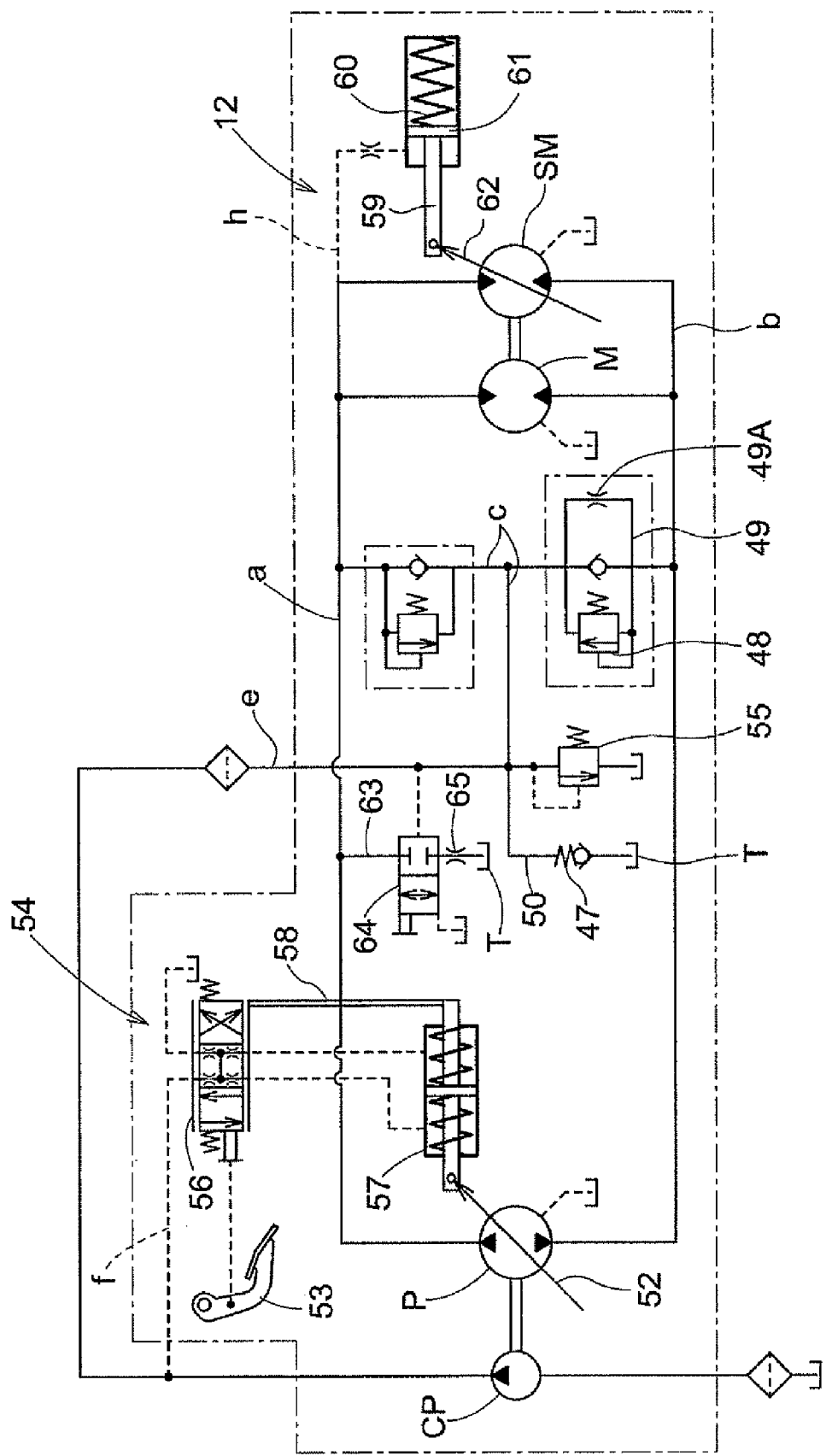
FIG. 9 is a hydraulic circuit diagram of a hydrostatic speed changing apparatus.

Next, a hydraulic circuit of the hydrostatic stepless speed changing apparatus 12 will be explained. As shown in FIG. 9, a swash plate 52 of the hydraulic pump P is operably coupled with an acceleration operating member 53 via a hydraulic servo mechanism 54. Upon release of an operation on the acceleration operating member 53, the swash plate 52 is returned and retained at its neutral position (swash angle: 0 degree), thereby to stop feeding of pressure oil, thus realizing a traveling stopped condition. Conversely, as the acceleration operating member 53 is operated progressively, this results in corresponding enlargement in the swash angle of the swash plate 52, so that the common output shaft 16 of the main hydraulic motor M is brought into the high speed rotation condition.

The hydraulic pump P and the main and auxiliary hydraulic motors M, SM are communicated with each other via a closed circuit Pa, Pb formed inside the hydraulic port block 18. The one closed circuit portion Pa is a high-pressure circuit for feeding the pressure oil from the hydraulic pump P to the main and auxiliary hydraulic pumps M, SM. The other closed circuit portion Pb transports the return oil, thus being configured as a low-pressure circuit. To this closed circuit Pa, Pb, there is connected a charge oil passage Pc for supplementing leaked oil amount. A charge pump CP driven by the engine 3 power feeds pressure oil to the charge oil passage Pc via a feed oil passage Pe. The oil pressure provided to the charge oil passage Pc is maintained at a set value by a relief valve 55.

Next, the hydraulic servo mechanism 54 will be explained. As shown in FIG. 9, the acceleration operating member 53 is mechanically coupled a servo valve 56 and this servo valve 56 is connected and communicated with a servo cylinder 57. The servo cylinder 57 is operably coupled to a swash plate operating portion of the hydraulic pump P and a feedback mechanism 58 is provided for feeding back a displacement of the servo cylinder 57 to the servo valve 56. Hence, the swash plate 52 of the hydraulic pump P is operated in correspondence with an operated position of the acceleration operating member 53. A primary oil passage Pf of the hydraulic servo mechanism 54 is connected to the charge oil passage Pc, so that the system pressure of the hydraulic servo mechanism 54 is equated with the charge pressure.

A swash plate 62 of the auxiliary hydraulic motor SM is retained and bound in the fore/aft direction between the leading end of a control piston 59 and a return piston 61 urged forwardly by a return spring 60. As shown, when the control piston 59 is retracted to its forward movement limit, the angle of the swash plate 62 of the auxiliary hydraulic motor SM is at its neutral (swash angle: 0 degree). As the control piston 59 is progressively advanced rearward against the return spring 60, the angle of the swash plate 58 is increased correspondingly, thereby to increase the displacement of the auxiliary hydraulic motor SM. The return spring 60 is assembled with a preset initial compression, thereby urging the swash plate 62 toward its neutral with a preset spring load.

The control piston 59 is connected via a control oil passage Ph to the highs-pressure circuit Pa for feeding the pressure oil from the hydraulic pump P to the main and auxiliary hydraulic motors M, SM, so that the angle of the swash plate 62 becomes stably fixed where the pressure of the high-pressure circuit Pa is balanced with the spring force of the return spring 60.

Next, an automatic speed change controlling operation using the control piston 59 will be explained.

In response to an operation on the acceleration operating member 53, the angle of the swash plate 62 of the hydraulic pump P is increased, so that an amount of pressure oil corresponding to this increased angle is fed to the main hydraulic motor M and the auxiliary hydraulic motor SM. In this case, if the traveling load is within a set range and the pressures of the high-speed circuit Pa and the control oil passage Pb are under set values, then, the initial spring force of the return spring 60 overwhelms the advancing force of the control piston 59 exposed to the pressure of the control oil passage Ph, so that the swash plate 62 of the auxiliary hydraulic motor SM is maintained at its neutral (swash angle: 0 degree). Hence, the total amount of pressure oil from the hydraulic pump P is fed to the main hydraulic motor M and the common output shaft 16 is driven by the main hydraulic motor M alone.

If the traveling load exceeds the set range and the pressures of the high-pressure circuit Pa and the control oil passage Ph exceed the set values, then, the advancing force of the control piston 59 exposed to the pressure of the control oil passage Ph overwhelms the initial spring force of the return spring 60. Hence, the angle of the swash plate 62 of the auxiliary hydraulic motor SM is increased to generate a motor capacity in the auxiliary hydraulic motor SM, whereby the pressure oil from the hydraulic pump P is fed to the main hydraulic motor M and the auxiliary hydraulic motor SM. That is to say, when the traveling load exceeds the set range, the total capacity of the motor side is automatically increased, thus driving the output shaft 32 with deceleration and with increased output torque.

After the swash angle of the auxiliary hydraulic motor SM has become maximum with increase in the traveling load, if this traveling load is further increased, this results in further increase in the pressure of the high-pressure circuit Pa. Here, the pressure of the circuit portion Pa is acting as a reaction force for returning the swash plate 52 of the hydraulic pump P toward its neutral and, under the normal traveling load condition, this reaction force is supported by the servo cylinder 57 of the hydraulic servo mechanism 54. However, when the pressure of the high-pressure circuit Pa is particularly increased to apply an increased hydraulic reaction force to the swash plate 52 as described above, it becomes no longer possible to maintain the swash angle by the servo cylinder 57 which operates at the low system pressure equal to the charge pressure, so that the swash plate 52 is automatically and forcibly displaced by the hydraulic reaction force in the swash angle decreasing direction, i.e. toward the deceleration side, whereby the pressure of the high-pressure circuit Pa is increased and the output torque is increased.

Incidentally, the acceleration operating member 53 for operating the hydraulic stepless speed changing apparatus 12 is operably coupled with a speed governing mechanism (not shown) for varying the rotational speed of the engine 3, thus providing also the function as an accelerator lever. Under a stop condition without any operation on the acceleration operating member 53, the engine 3 is at its idling rotational speed. Then, as the acceleration operating member 53 is operated to increase the traveling speed, the rotational speed of the engine is increased.

As shown in FIG. 9, a relief pressure of a relief valve 48 provided in the charge circuit Pc to the low-pressure circuit Pb is set to a half of that of the convention and also there is provided a bypass passage 49 bypassing the check valve. And, an orifice 49A is provided in this bypass passage 49. With these, the engine brake performance is improved.

A first return oil passage 50 communicating the charge circuit Pc with the hydraulic tank T is provided and an anti-cavitation valve 47 is incorporated in this return oil passage 50. When the pressure of the charge circuit Pc becomes negative, the work oil in the hydraulic tank T is introduced to the charge circuit Pc, thereby to restrict occurrence of a negative pressure at the time of engine braking operation, due to the above-described reduction in the relief pressure of the relief value 48.

Next, the operative coupling between the brake lever 42 and the hydrostatic stepless speed changing apparatus 12 will be explained. As shown in FIG. 9, between the high-pressure circuit Pa of the hydrostatic stepless speed changing apparatus 12 and the hydraulic tank T, there is provided a return oil passage 63, in which an unload valve 64 is incorporated. Further, between this unload valve 64 in the return oil passage 63 and the hydraulic tank T, a throttle valve 65 is provided. The unload valve 64 and the brake pedal 42 are operably coupled with each other such that the oil pressure of the high-pressure circuit Pa of the hydrostatic stepless speed changing apparatus 12 is released by the unload valve 64, thereby allow light and smooth lever operation of the auxiliary speed change operating lever 69.

Figure 10:
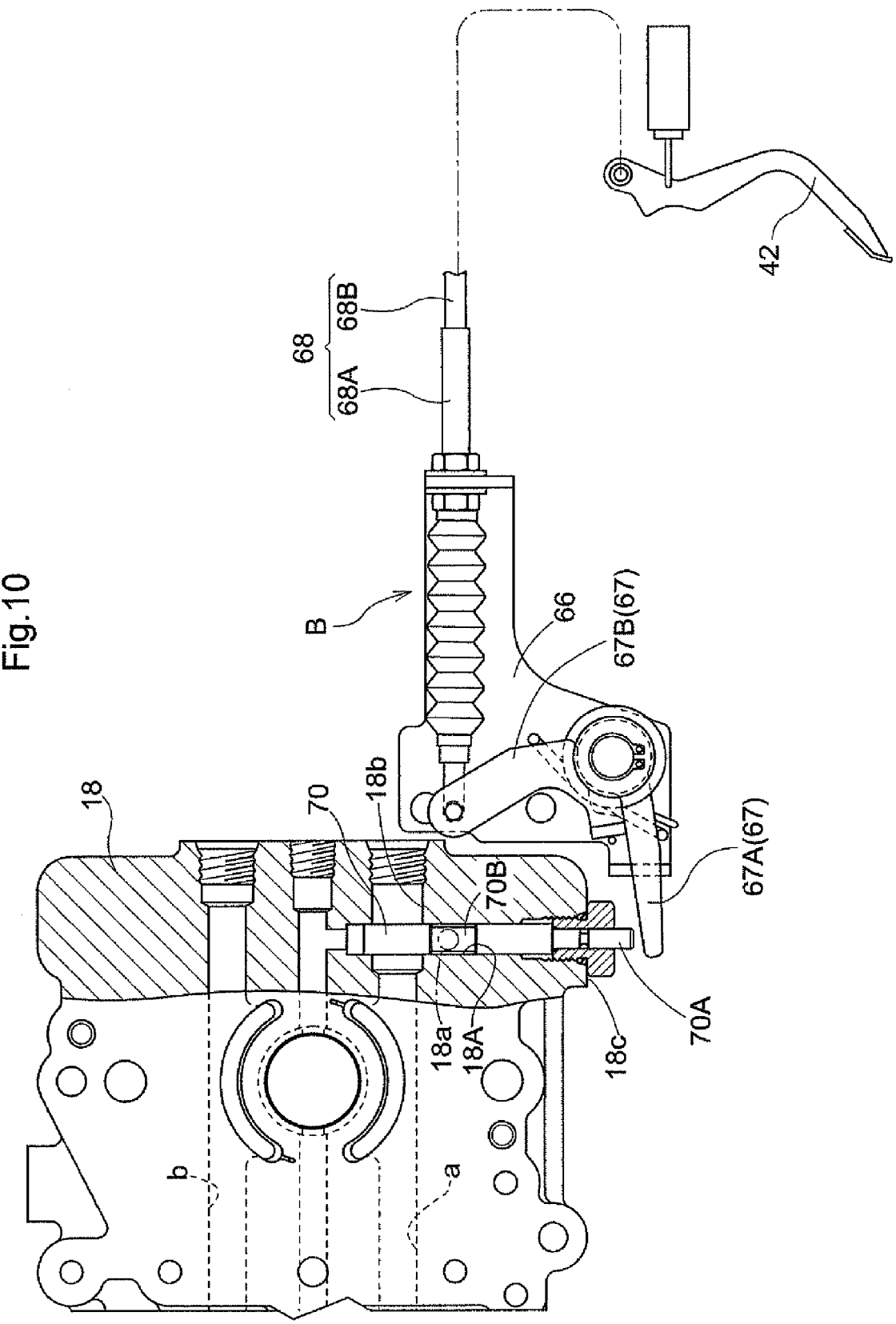
FIG. 10 is a side view in vertical section showing an operably coupling mechanism between a brake operating member and an unload valve, the view illustrating a condition prior to an operation of the unload valve.

Next, the mechanical coupling mechanism B between the unload valve 64 and the brake pedal 42 as a brake operating member, will be explained. As shown in FIG. 4, FIG. 10 and FIG. 11, the hydraulic port block 18 is formed like a thin flat plate and arranged with opposed lateral faces thereof oriented along the fore/aft direction of the vehicle body. In this hydraulic port block 18, the high-pressure oil passage Pa and the low-pressure oil passage Pb of the hydrostatic stepless speed changing apparatus 12 are formed in the thickness of the port block 18, one above the other along the flat plate-like lateral faces.

Within the thickness of the hydraulic port block 18, there is provided a spool accommodating passage 18A extending normal to the high pressure oil passage Pa upwardly from the lower face 18c. The unload valve 64 is provided within the hydraulic port block 18. The spool accommodating passage 18A accommodates a spool 70. The spool 70 includes a leading end portion 70A projecting from the hydraulic port block 18 and an intermediate portion 70B formed with a smaller diameter than the spool accommodating passage 18A. At an intermediate position of the spool accommodating passage 18, there is formed an escape passage 18a along the thin thickness direction of the hydraulic port block 18. This escape passage 18a is connected with the hydraulic tank T. On the other hand, at a deeper position of the spool accommodating passage 18A than the escape passage 18a, there is formed a large-diameter opening portion 18b open to the high pressure oil passage Pa. The unload valve 64 is constructed of this spool 70 and of the spool accommodating passage 18A. Also, the spool accommodating passage 18A and the escape passage 18A will be referred to as a return oil passage 63 from the high-pressure oil passage Pa to the hydraulic tank T.

As shown in FIG. 10, when the leading end 70A of the spool 70 projects beyond a lower face 18c of the hydraulic port block 18, the intermediate portion 70B of the spool 70 is located downwardly of the large-diameter opening 18b, so the escape passage 18a is not in communication with the high-pressure oil passage Pa. Then, from this non-communicated condition, if the spool 70 is pressed upward as illustrated in FIG. 11, the intermediate portion 70B smaller in diameter than the spool accommodating passage 18 is positioned over a range from the large-diameter opening 18b open into the high-pressure oil passage Pa to the escape passage 18a. With this, the high-pressure work oil is moved downwards from the high-pressure oil passage Pa through a gap formed between the intermediate portion 70B of the spool 70 and the inner peripheral face of the spool accommodating passage 18A, to reach the escape passage 18a, through which the oil is guided to the hydraulic tank T.

Next, there will be described an arrangement for pushing in the spool 70. A bracket 66 extends erect from the lateral face of the transmission case 11 and this bracket 66 is disposed adjacent a projecting leading end 70A of the spool 70 projecting from the hydraulic port block 18. A push-in arm 67 in the form of a bell crank is pivotally attached to the bracket 66. And, a push-in portion 67A of the push-in arm 67 is disposed at a position contactable with the projecting leading end 70A of the spool 70.

As shown in FIG. 10, at a position on the bracket 66 away from the hydraulic port block 18, there is fixedly attached an outer 68A of a release wire 68 operably coupled to the brake pedal 42. From this outer 68A to a connecting portion 67B of the push-in arm 67, there is extended an inner 68B covered with a bellows-like cover 68C, with a leading end of the inner 68B being connected to the connecting portion 67B.

With the above-described construction in operation, from the condition illustrated in FIG. 10, if the brake pedal 42 is stepped on to the braking side as illustrated in FIG. 11, the inner 68B is pulled, so that the push-in arm 67 is rotated counterclockwise on the plane of FIG. 11. With this rotation, the push-in portion 76A of the push-in arm 67 comes into contact with the lower end face of the leading end portion 70A of the spool 70, thereby driving the spool 70 upwards and pushing it into the hydraulic port block 18. Then, as illustrated in FIG. 12, the condition is switched over into a condition where the small-diameter intermediate portion 70B of the spool 70 brings the high-pressure oil passage Pa and the escape passage 18b into communication with each other, whereby the work oil in the high-pressure oil passage Pa can be returned to the hydraulic tank T. With this, as described hereinbefore in the section describing the function/effect, the driving toque in the hydrostatic stepless speed changing apparatus 12 is released, thus allowing smooth gear switchover operation at the auxiliary speed changing apparatus 13.

As shown in FIG. 9, the escape passage 18a incorporates the throttle valve 65. With provision of this throttle valve 65, a braking operation, when effected, does not result in immediate removal of the high-pressure work oil of the hydrostatic stepless speed changing apparatus 12. Hence, this can restrict such phenomenon as inadvertent backward movement of the work vehicle.

[General Construction of Vehicle Body Frame]

As shown in FIG. 1, to an upper portion of the vehicle body frame 10, there are detachably attached the right and left side ROPS members 141 which will be described later. And, between and across these right and left side ROPS members 141, there are detachably attached the front and rear upper transverse ROPS members 142, thereby constituting the ROPS 140. To upper portions of the side ROPS members 141 and the upper transverse ROPS members 142, roof members (not shown) are attached from the above. With this, the space upwardly of the passengers' space formed in the driving section 7 is covered by these roof members.

At a front portion of the work vehicle, there is attached the front cover 114. This front cover 114 consists of the lower cover 114a for covering the front portion of the work vehicle from its front and lateral sides, and the upper cover 114b for covering the front portion of the work vehicle from its upper side. To a rear portion of the front cover 114, there is attached the control panel 115 covering the front face side of the driving section 7. And, from the left side of this control panel 115, there is extended the steering wheel 116 for steering the right and left front wheels 1.

[Detailed Construction of Vehicle Body Frame]

Figure 13:
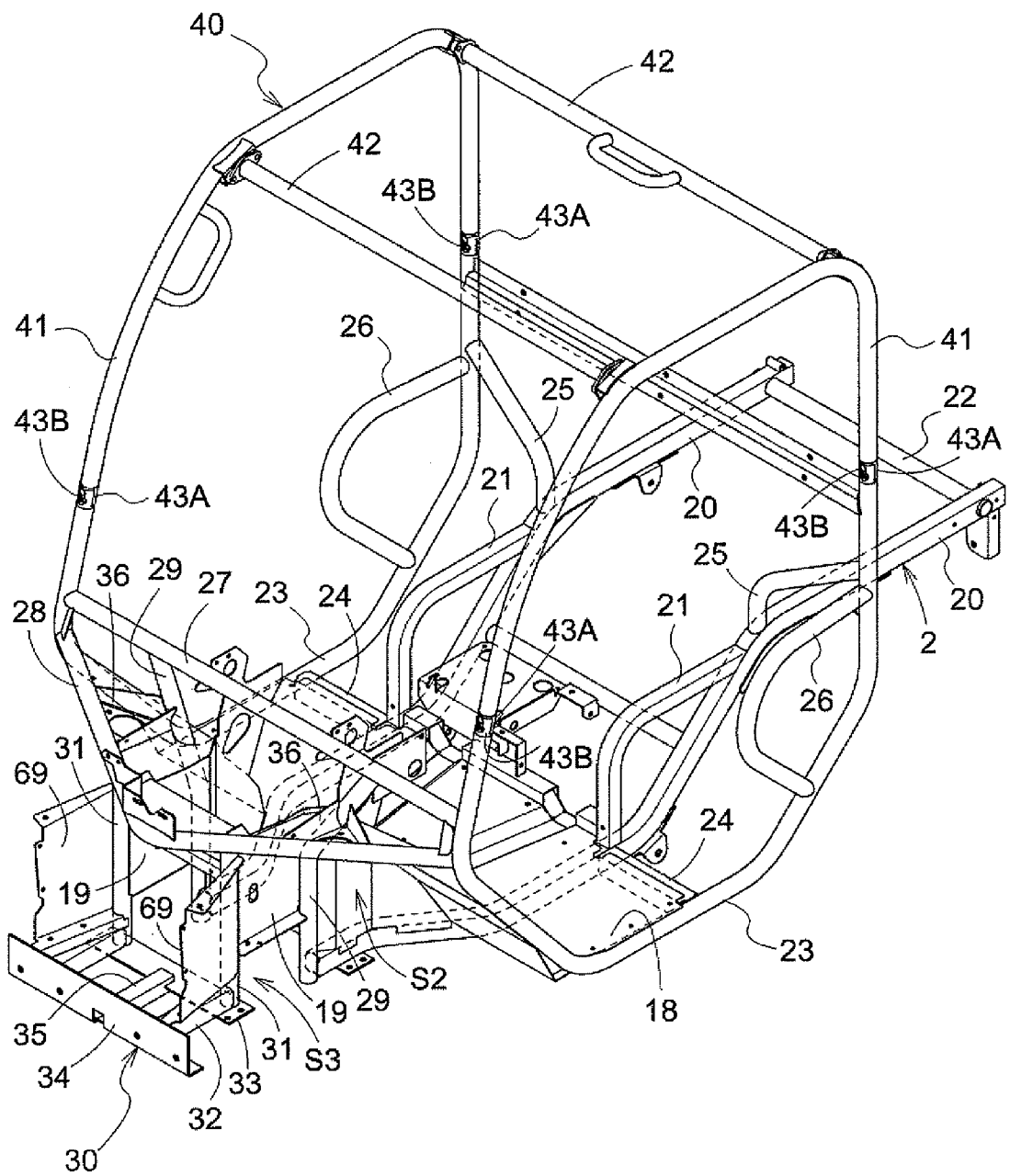
FIG. 13 is an overall perspective view of a vehicle frame.

Next, with reference to FIG. 13, the detailed construction of the vehicle body frame 10 of the work vehicle will be explained. FIG. 13 is an overall right side view of the vehicle body frame 10. As shown in FIG. 13, the vehicle body frame 10 includes a pair of right and left main frames 120, a pair of right and left side frames 123, a front frame 130, etc.

The right/left main frame 120 is formed by bending or curving a single angular pipe member in the vertical and right/left directions. With this, compared with a case of forming the main frame 120 by e.g. welding a plurality of members to each other, the strength of the main frame 120 may be improved and the manufacturing costs can be reduced.

At the fore/aft center portion between the right/left main frame 120, there is fixed a seat supporting frame 121 formed of angular pipes. And, a seat supporting panel 5a is mounted so as to cover the upper, front and right and left sides of this seat supporting frame 121 (see FIG. 1). Across and between rear end portions of the right and left main frames 120, there are connected a straight front transverse frame 127 formed of angular pipe member and a front bent frame 128 formed bent in the L-shape of a round pipe. Upwardly from the front ends of the right and left main frames 120, there are extended right and left vertical frames 129 formed bent of round pipe members. And, the upper end portions of these right and left vertical frames 129 are connected respectively with the right and left sides of the front transverse frame 127.

The right/left side frame 23 is formed by bending or curving round pipe members into an upwardly open shape. The fore/aft center portions of the right and left side frames 123 are connected to right and left connecting frames 24 extending laterally outward from the fore/aft center portions of the right and left main frames 120. Rear portions of the right and left side frames 123 are connected to connecting frames 25 extending from the rear upper sides of the right and left main frames 120. To rear portions of the right and left side frames 123, there are connected reinforcing frames 126 used also as gripping handles for riding/descending passenger.

Between the front portion of the left side frame 123 and the front portion of the right side frame 123, there are connected a straight front transverse frame 127 formed of a round pipe member and a front bent frame 128 formed in L-shape in a plan view of a round pipe member. Upwardly from the front end portions of the right and left main frames 120, there are extended right and left vertical frames formed bent of round pipe members. And, upper end portions of the right and left vertical frames 129 are connected to the right and left sides of the front transverse frame 127.

At the right/left center portion of the front bent frame 128, a front frame 130 is connected. This front frame 130 includes right and left front vertical frames 131 extending downward from the right/left center portion of the front bent frame 128, right and left fore/aft frames 132 extending forwardly from the lower ends of the right and left front vertical frames 131, a horizontal frame 134 fixed between the front end portions of the right and left fore/aft frames 132 and a center fore/aft frame 135 fixed between the right/left center portion of the lower frame 133 and the right/left center portion of the horizontal frame 134.

Between and across the right and left vertical frames 129 and the right and left front vertical frames 131, there are fixedly attached right and left side panels 119 formed like a vertical flat plate oriented along the fore/aft direction. And, the lower end of the right and left side panel 119 is bent laterally outwards.

Between the right and left end portions of the front bent frame 128 and the right and left vertical frames 129, there are fixed right and left front wheel supporting brackets 136 which will be described later. And, to this front wheel support bracket 136, an upper end portion of a front wheel suspension mechanism 137 is connected. And, to front portions of the vehicle body frame 10, the right and left front wheels 1 are supported via front wheel suspension mechanisms 137. Incidentally, at the rear portion of the vehicle body frame 10, the right and left rear wheels 2 are supported via rear wheel suspension mechanism 138 having suspension coil springs (see FIG. 1).

[Construction of ROPS and Mounting Arrangement of ROPS]

Figure 14:
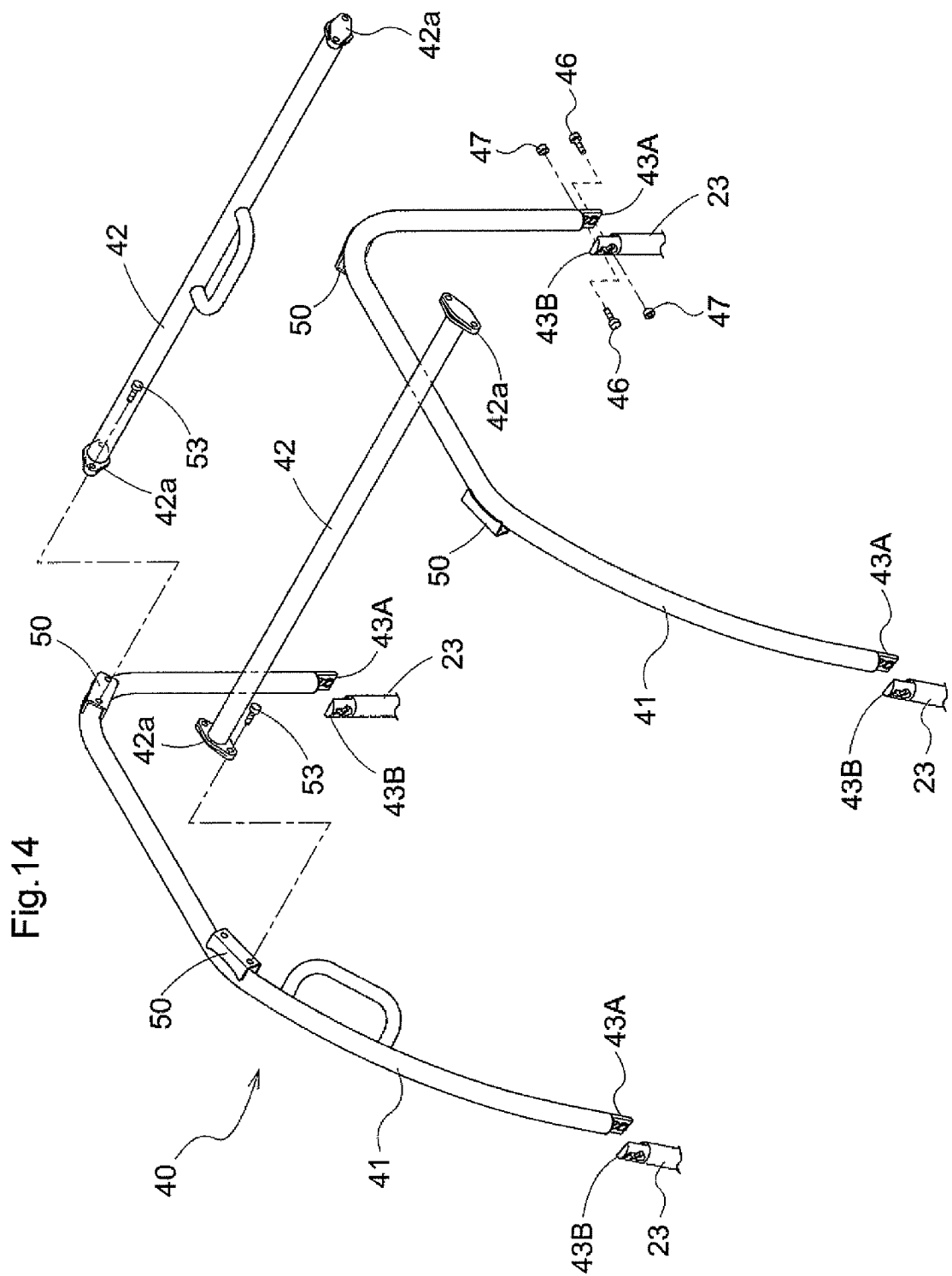
FIG. 14 is an overall perspective view of a ROPS (Roll-Over Protection System)
Figure 15:
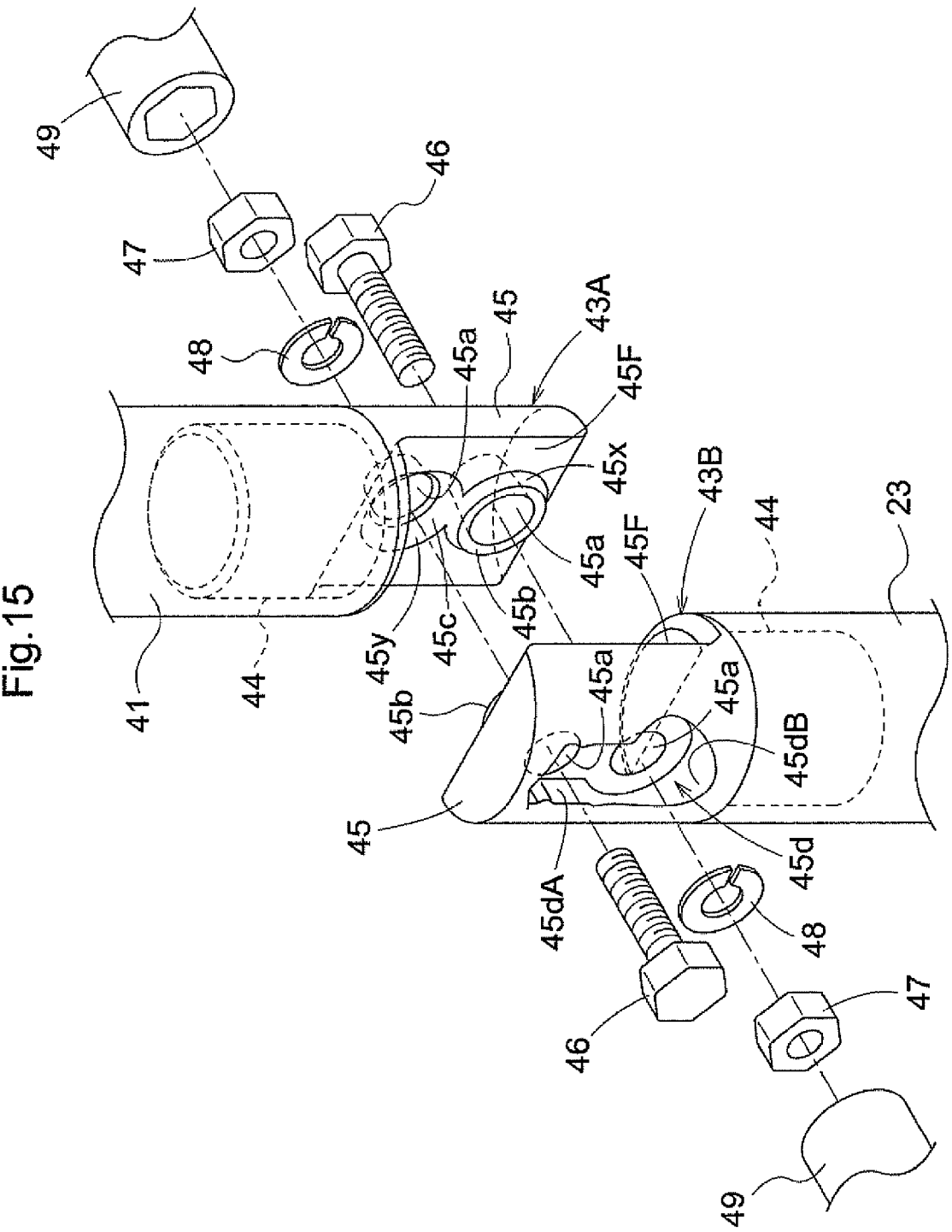
FIG. 15 is a perspective view showing connection between a side frame ad a side ROPS member.
Figure 16:
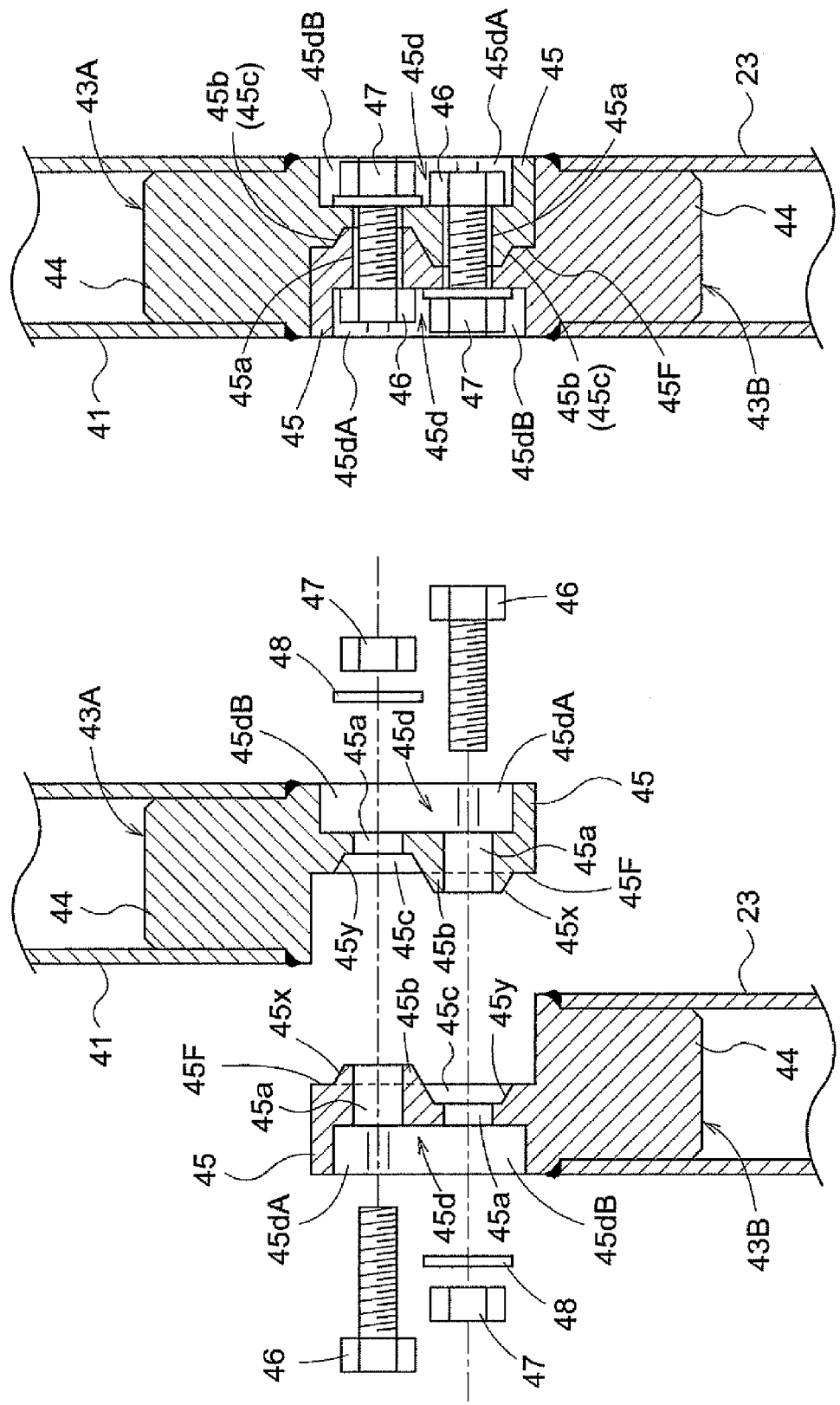
FIG. 16A is a side view in vertical section showing the connection between the side frame and the side ROPS member.
FIG. 16B is a side view in vertical section showing the connection between the side frame and the side ROPS member.
Figure 17:
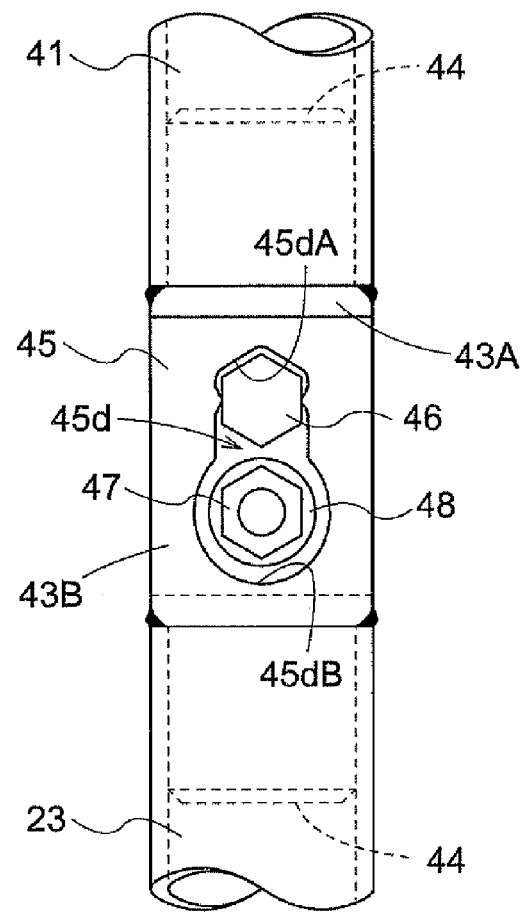
FIG. 17 is a front view showing the connection between the side frame and the side ROPS member.
Figure 18:
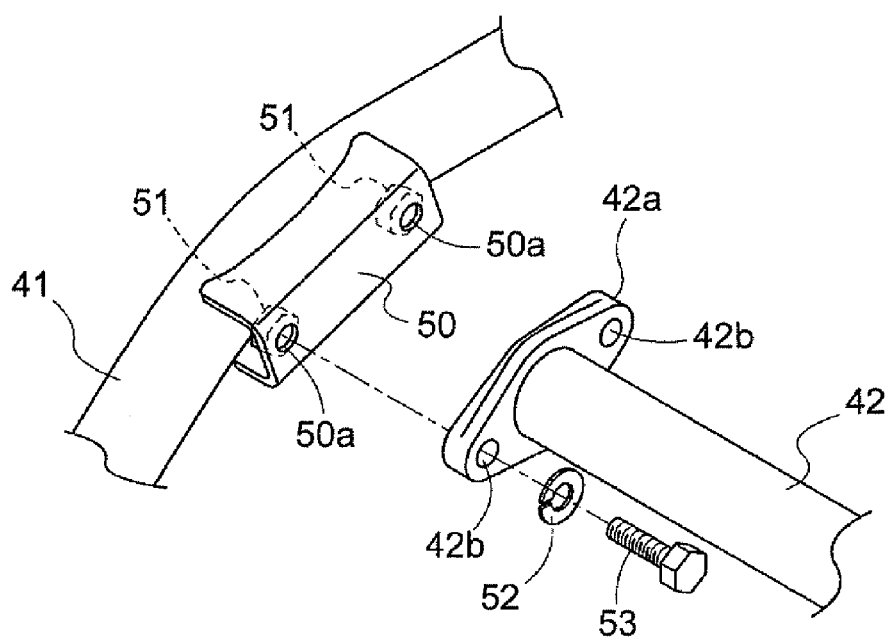
FIG. 18 is a perspective view showing the connection between the side ROPS member and an upper transverse ROPS member.

With reference to FIGS. 13-18, there will be described the construction of the ROPS 140 and the mounting arrangement of the ROPS 140. FIG. 14 is an overall perspective view of the ROPS 140. FIG. 15 is a perspective view showing connection between the side frame 123 and the slide ROPS member 141. FIG. 16 is a side view in vertical section showing connection between the side frame 123 and the side ROPS member 141. FIG. 17 is a front view showing connection between the side frame 123 and the side ROPS member 141. FIG. 18 is a perspective view showing connection between the side ROPS member 141 and the upper transverse ROPS member 142.

As shown in FIG. 13 and FIG. 14, the ROPS 140 includes the right and left side ROPS members 141, the front upper transverse ROPS member 142, and the rear upper transverse ROPS member 142, so that this ROPS 140 is configured as a four-pillar type construction. The right and left side ROPS members 141 are formed of bent or curved round pipe members into a downwardly open shape. And, the right and left side ROPS members 141 as connected to the right and left side frames 123 together with the right and left side frames 123 form a loop-like right and left side frame for the driving section 7.

The front upper transverse ROPS member 142 formed straight of a round pipe member is detachably attached to and between the upper front portions of the right and left ROPS members 141. The rear upper transverse ROPS member 142 formed straight of a round pipe member is detachably attached to and between the upper rear portions of the right and left ROPS members 141. The right and left side ROPS members 141 are connected to each other via the front and rear upper transverse ROPS members 142, thereby improving the strength of the right and left side ROPS members 141 at the upper sides thereof in the right/left direction. The front upper transverse ROPS member 142 and the rear upper transverse ROPS member 142 are formed identical in their lengths and shapes, differing only in that a hand grip is fixed to a right/left center portion of the rear upper transverse ROPS member 142. The above arrangements contribute to communization of the members.

As shown in FIG. 14 and FIG. 15, at the front lower ends and the rear lower ends of the right and left side ROPS members 141, there are fixed fore/aft first connecting members 143A by being welded thereto. At the front upper ends and the rear upper ends of the right and left side frames 123, there are fixed fore/aft second connecting members 143B by being welded thereto. Then, by connecting the fore/aft first connecting members 143A fixed to the right and left side ROPS members 141 with the fore/aft second connecting members 143A fixed to the right and left side frames 123, the right and left side ROPS members 141 can be connected with the right and left side frames 123.

For instance, when the work vehicle is to be loaded on a truck for its shipping or transportation for a long distance, the connections of the first and second connecting members 143A, 43B will be released, thus removing the ROPS 140 (the side ROPS members 141) from the side frames 123. Then, the upper transverse ROPS members 142 will be detached from the side ROPS members 141, so that the components constituting the ROPS 140 will be disassembled into individual units (the upper transverse ROPS 142 may be detached first). With these, the work vehicle can be loaded on the loading platform of the truck or the like, with minimizing the height of the work vehicle. In this case, the side ROPS members 141 and the upper transverse ROPS members 142 disassembled in the compact manner will be loaded adjacent the work vehicle loaded on the loading platform of the truck or the like. With this, the transportation efficiency of the work vehicle by the truck or the like (loading efficiency to the truck or the like) can be improved. Incidentally, when the work vehicle is to be dismounted form the loading platform of the truck or the like, the ROPS 140 will be assembled to the side frames 123 (to the side of the vehicle body frame 10) in a manner to be described later.

As shown in FIG. 15 and FIG. 16, the first and second connecting members 143A, 143B are formed of a single type of component of an identical shape. Hence, by e.g. changing the direction of attaching the side frames 123 and the side ROPS members 141, the same component can function as the first and second connecting members 143A, 143B. With this, communization of the members is achieved. As a result, it becomes possible to save e.g. the costs of machining the first and second connecting members 143A, 143B.

The first and second connecting members 143A, 143B are formed by integrally forming a cylindrical frame side insertion portion 144 and a semi-cylindrical connecting portion 145 by e.g. forging, machining, etc. The outer diameter of the frame side inserting portion 144 is sized to be slightly smaller than the inner diameter of the pipes of the side frame 123 and the side ROPS member 141. The length of the frame side inserting portion 144 is sized to be longer than the inner diameter of the pipes of the side frame 123 and the side ROPS member 141. With these arrangements, the first and second connecting members 143A, 143B can be easily inserted into the side frame 123 and the side ROPS member 141. Also, the first and second connecting members 143A, 143B can be easily connected with the side frame 123 or the side ROPS member 141.

The connecting portion 145 includes a contacting face 145F formed flat and oriented vertically and in the right/left direction. When the contacting faces 145F, 145F of the pair of connecting portions 145, 145 are placed in contact and assembled with each other, there is formed a semi-cylindrical cross sectional shape of the connecting portions 145, with the outer diameter of the pair of connecting portions 145 being substantially equal to the outer diameters of the side frame 123 and the side ROPS member 141. With this, the side frame 123 and the side ROPS member 141 can be connected without forming any stepped portions therebetween by the first and second connecting members 143A, 143B, thereby realizing compact connecting construction of the side frame 123 and the side ROPS member 141.

The connecting portion 145 defines two attaching holes 145a. In the outer peripheral portion of one attaching hole 145a on the side of its adjacent the contacting face 145F, there is integrally formed a convex portion 145b projecting in the form of a ring. In the outer peripheral portion of the other attaching hole 145a on the side of its adjacent the contacting face 145F, there is integrally formed a concave portion 145c projecting in the form of a ring.

When the contacting face 145F of the first connecting member 143A is placed in contact with the contacting face 145F of the second connecting member 143B, the convex portion 145b of the first connecting member 143A comes into gapless engagement with the concave portion 145c of the second connecting member 143B. With this, the convex portion 145b and the concave portion 145c of the first connecting member 143A engage respectively with the concave portion 145c and the convex portion 145b of the second connecting member 143B, so that the engagement between the concave portion 145c and the convex portion 145b can support a force applied along the right/left direction to the side ROPS member 141 fixed to the first connecting member 143A. As a result, the first and second connecting members 143A, 143B can be connected to each other firmly and with high precision.

As shown in FIG. 16, in the outer peripheral portion of the convex portion 145b, there is formed an sloped portion 145x along the entire periphery. With this, the cross sectional shape of the outer peripheral portion of the convex portion 145b is formed along the entire periphery like a mountain. On the other hand, in the outer peripheral portion of the concave portion 145c, there is formed a sloped portion 145y along the entire periphery. With this, the cross sectional shape of the outer peripheral portion of the concave portion 145c is formed along the entire periphery like a valley. The angle of the sloped portion 145x of the convex portion 145b and the angle of the sloped portion of the concave portion 145c are set to a same value. Hence, when the contacting face 145F of the first connecting member 143A is in contact with the contacting face 145F of the second connecting member 143B, the sloped portion 145x (sloped portion 145y) of the first connecting member 143A contact with the sloped portion 145y (sloped portion 145x) of the second connecting member 143B.

As described above, with the formation of the sloped portion 145x in the convex portion 145b and the formation of the sloped portion 145y in the concave portion 145c, from the condition illustrated in FIG. 16 (*a*), if a bolt 146 or the like is inserted into the attaching holes 145a, 145a of the first and second connecting members 143A, 143B and then fastened, the sloped portion 145x of the convex portion 145b in the form of a mountain comes into abutment with the sloped portion 145y of the concave portion 145c in the form of a valley, so that as the convex portion 145b enters the convex portion 145c as being guided by the sloped portion 145c of the concave portion 145c. With this, as illustrated in FIG. 16 (*b*), the contacting face 145F of the first connecting member 143A come into contact with the contacting face 145F of the second connecting member 143B, thus fixing the first and second connecting members 143A, 143B. With these arrangements, even when it is difficult to achieve alignment between the position of the attaching hole 145a of the first connecting member 143A and the attaching hole 145a of the second connecting member 14313 due to a manufacturing error in the ROPS 140 and/or the vehicle body frame 10, the first connecting member 143A and the second connecting member 143B can be easily fixed in position relative to each other, by fastening these first and second connecting members 143A, 143B together.

For instance, when the ROPS 140 is to be assembled to the vehicle body frame 10, the bolt 146 will be inserted through the first connecting member 143A fixed to the side of the side ROPS member 141 and also through the second connecting member 143B fixed to the side of the side frame 123, and fastened lightly. And, a bolt 153 will be inserted through a flange member 42a of the upper transverse ROPS member 142 and a bracket 150 of the right/left side ROPS member 142 and fastened lightly. Thereafter, the bolt 146 and the bolt 153 will be fastened firmly. With this, the ROPS 140 can be fixed to the vehicle body frame 10. In this case, when the bolt 146 is fastened firmly, the sloped portions 145x, 145y serve to allow the first connecting member 143A and the second connecting member 142B to be fixed in position relative to each other automatically. Hence, there is no need of positioning or correcting operation, etc. of the ROPS 140 at the time of assembly or maintenance thereof. Consequently, the ROPS 140 can be mounted to the vehicle body frame 10 in an easy and speedy manner.

As shown in FIG. 16 and FIG. 17, on the opposite side of the connecting portion 145 to the side where the contacting face 145F is formed, there is integrally formed a concave portion 145d concave to the contacting face 145F side. The concave portion 145d has a shape different from the two attaching holes 145a and is comprised of a bolt-side concave portion 145bA formed in a hexagonal shape in compliance with the shape of the head of the bolt 146 and a nut-side concave portion 145dB formed in a cylindrical shape.

As shown in FIG. 16A, from the bolt-side concave portion 145dA of the first connecting member 143A, a bolt 146 will be inserted through the attaching hole 145a, and from the nut-side concave portion 145dB of the second connecting member 143B, a nut 147 will be threaded via a spring washer 148 onto a leading end threaded portion of the bolt 146. From the bolt-side concave portion 145dB of the second connecting member 143B, a bolt 146 will be inserted through the attaching hole 145a, and from the nut-side concave portion 145dB of the first connecting member 143A, a nut 147 will be threaded via a spring washer 148 onto a leading end threaded portion of the bolt 146. In this case, by the bolt-side concave portion 146dA formed in the hexagonal shape, rotation of the bolt 146 head can be prevented. For instance, by pressing, with one hand, the head of the bolt 146 against the first or second connecting member 143A, 143B and fastening the nut 147 with the other hand, the first and second connecting members 143A, 143B can be readily fixed in position and connected with each other.

As shown in FIG. 16B, the depth of the concave portions 145d of the first and second connecting members 143A, 143B is sized to be greater than the thickness of the head of the bolt 146 and the combined thickness of the nut 46 and the spring washer 148 superposed each other. As a result, the head of the bolt 146 and the nut 46 can be accommodated in a compact manner in the concave portion 145d of the first and second connecting members 143A, 143B, thereby preventing the head of the bolt 146 and the nut 46 from projecting to the outside of the first and second connecting members 143A, 143B. Further, the nut-side concave portion 143dB is provided with a shape which allows smooth insertion of a cylindrical fastening tool 49. As a result, the nut 147 can be fastened easily and smoothly by the fastening tool 49 (see FIG. 15).

As shown in FIG. 14 and FIG. 18, at an upper front portion and an upper rear portion of the right/left side ROPS member 141, there is respectively fixed a bracket 150. The bracket 150 has a vertical cross sectional shape in the form of a rectangle with one side open to the outside and the bracket 150 is fixedly attached so as to project to the inner side from the right/left side ROPS member 141. Further, the bracket 150 defines two attaching holes 150a oriented along the right/left direction. And, on the outer face of the bracket 150 at the positions of these two attaching holes 150a, nuts 151 are respectively fixed by means of welding, prior to its attachment to the side ROPS member 141.

At right and left opposed ends of the upper transverse ROPS member 142, flange members 42a are fixedly attached. Each flange member 42a defines two attaching holes 42b oriented along the right/left direction. Then, by bringing the attaching holes 42b of the flange member 42a in alignment with the attaching holes 150a of the bracket 150 and fastening the bolts 153 via the washers 52 from the inner side, the upper transverse ROPS member 142 can be connected to the side ROPS member 141. In this case, as the nuts 151 are welded in advance to the bracket 150, in fixing and aligning the upper transverse ROPS member 142 to the right/left side ROPS member 141, there is no need for e.g. pressing the nuts 151 with fingertips. Hence, the connecting operation of the upper transverse ROPS member 142 to the side ROPS member 141 can be carried out easily and speedily.

With the above-described construction of the ROPS 140 (the right and side HOPS members 141 and the front and rear upper transverse ROPS members 142), it is possible to improve the strength of the connection to the vehicle body frame 10 and also to provide the ROPS which can be readily attached and detached and which has good appearance.

[Construction of Engine Section]

Figure 19:
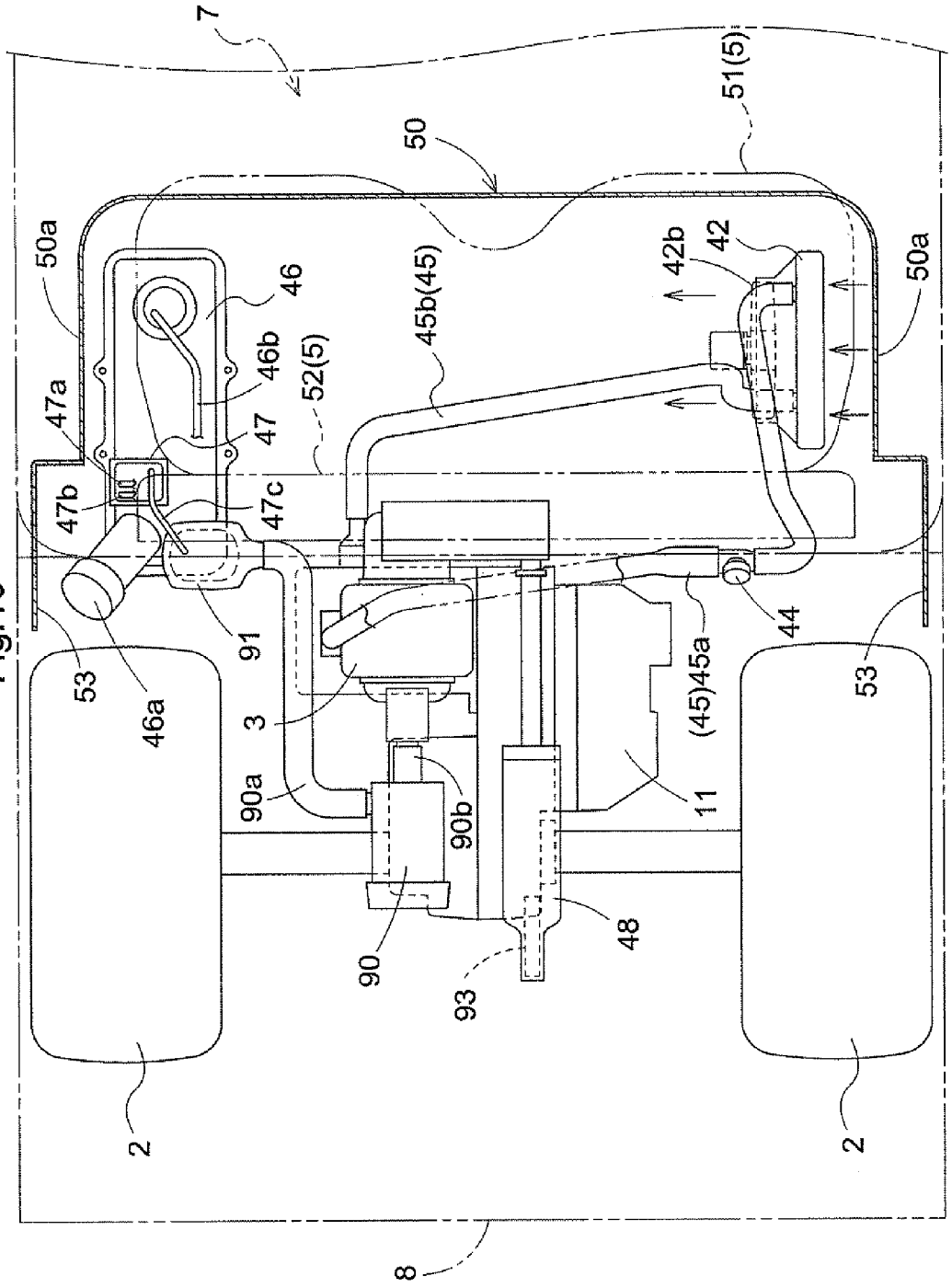
FIG. 19 is a plan view show a positional relationship between a driver's seat and an engine section.

As shown in FIG. 19, the (water-cooled) engine 3 is disposed on the left side and the transmission case 111 is disposed on the right side. And, the engine 3 and the transmission case 111 are disposed on the rear side of the vehicle body, within the right/left spacing between a fuel tank 246 and a radiator 242 in the plan view.

That is, as shown in FIG. 19, the engine 3 and the transmission case 111 are disposed with offsets both in the fore/aft direction and the right/left direction in the plan view, relative to the fuel tank 246 and the radiator 242, so as to minimize the fore/aft dimension of the engine/transmission case space.

Figure 20:
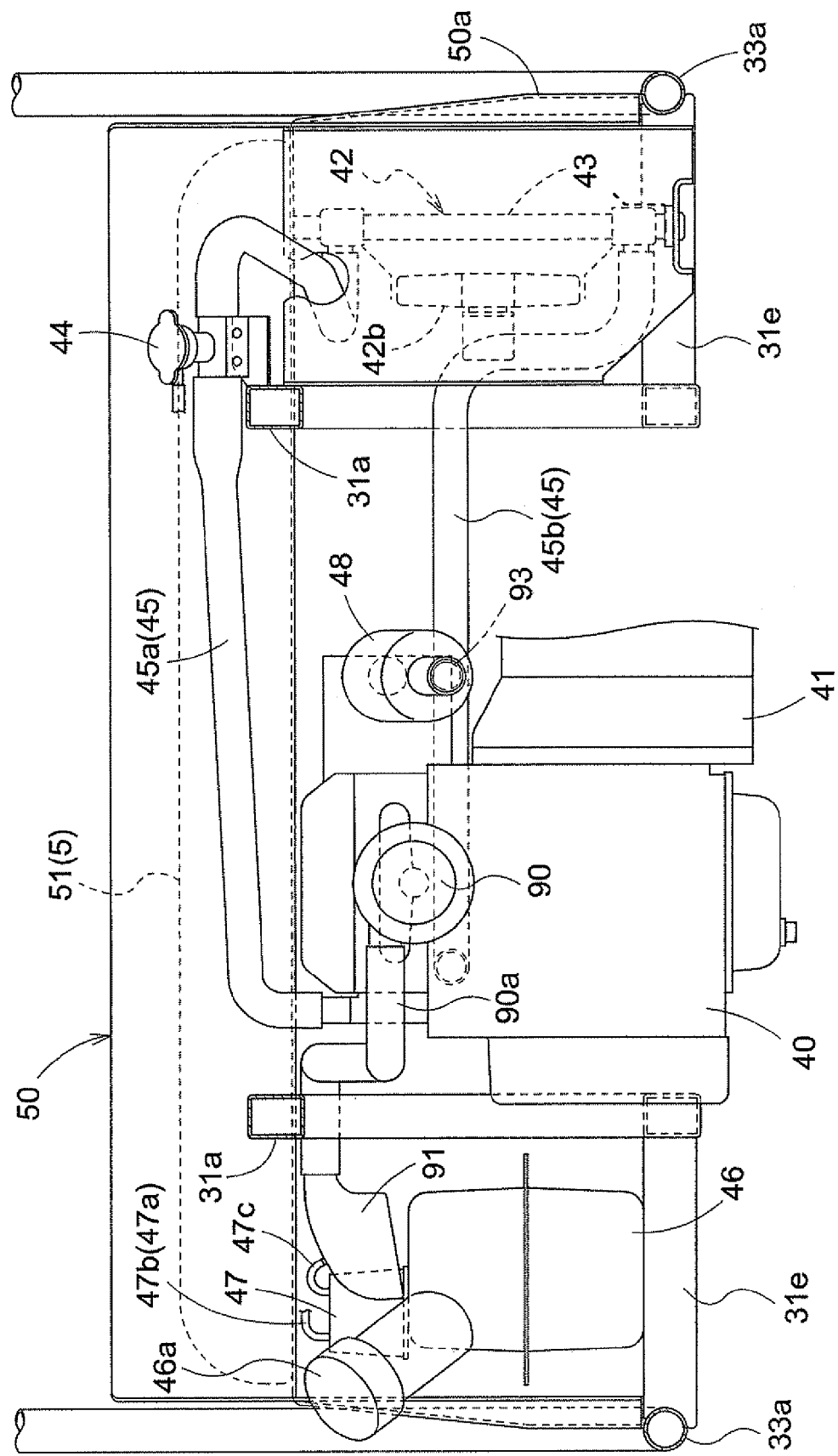
FIG. 20 is a rear view of the engine section.

To the engine 3 and the radiator 242, there is connected a cooling water circulating pipe 245 consisting of a return side circulating pipe 245a for collecting cooling water after heat exchange to the upper end side of the radiator 242 from a cooling water jacket (not shown) of the engine, and a feeding side circulating pipe 245b for feeding cooling water to the cooling jacket from the lower end side of the radiator 242. And, in the radiator 242, its water feed inlet 244 is provided separately from a radiator body 243 incorporating a heat exchanging section therein and this water feed inlet 244 portion is provided at a position offset from the seat of the driver's seat 5, as shown in FIG. 19 and FIG. 20.

That is to say, the water feed inlet 244 is provided at a position which is in midway of the cooling water circulating pipe 245 disposed at a higher position than the upper end of the radiator body 243 and a cooling jacket of the engine 3 and which is relatively closer to the lateral outer side, so as to facilitate water feeding operation from the lateral outer side of the vehicle body.

Further, this disposing position of the water feed inlet 244 is a space under the loading platform 9 or a space between the loading platform 9 and the driver's seat 5, so as to prohibit an opening/closing operation of this water feed inlet 244 from the outside. Therefore, this disposing position is designed so as to allow the operation from the outside by opening up the space around the water feed inlet 244, in association with an upward lifting operation of the loading platform about a horizontal axis x1. In this embodiment, the disposing position of the water feed inlet 244 is the highest position of the cooling water circulating pipe 245.

Numeral 248 in FIG. 19 denotes a muffler. At the terminal end of gas exhaust cylinder of this muffler 248, there is attached a spark arrester 93 for removing fire sparks in the exhaust gas.

[Construction of Fuel Feeding Line]

Figure 21:
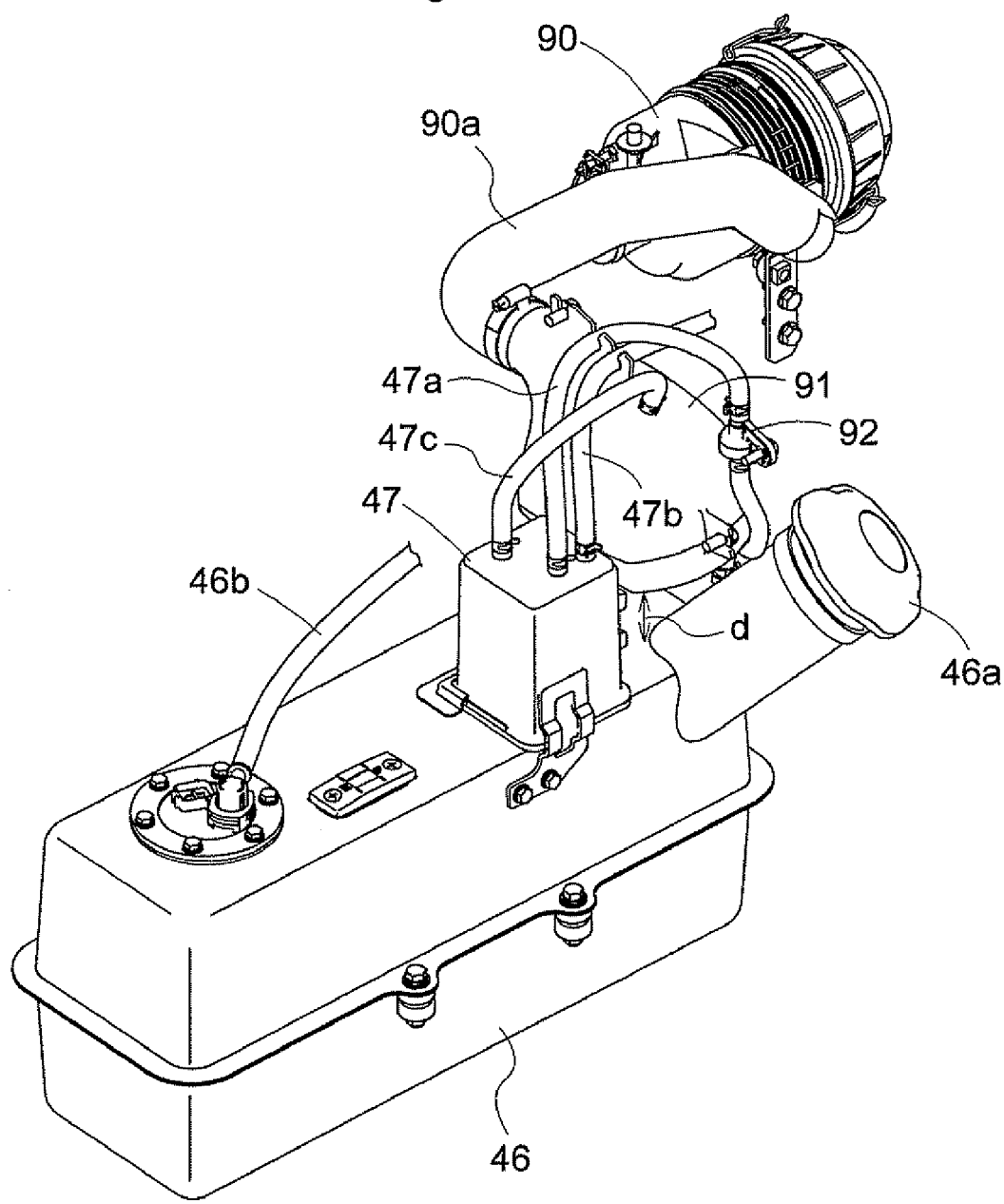
FIG. 21 is a perspective view showing a fuel feeding line.
Figure 22:
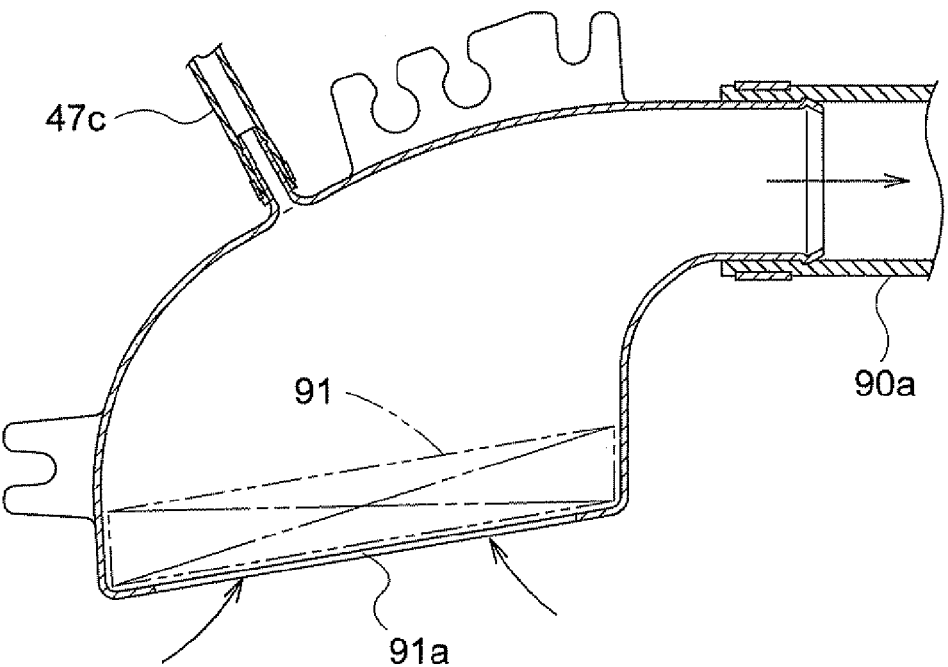
FIG. 22 is a section view showing a pre cleaner portion.

FIG. 21 shows a layout relationship among the fuel tank 246, a canister 247 incorporating adsorbent such as carbon for adsorbing evaporated fuel from the fuel tank 246, an air cleaner 90 for feeding combustion air to the engine 3, and a pre cleaner 91 disposed upstream of the intake passage of this air cleaner 90.

The above components are not arranged inside the engine hood, but are arranged rearwardly of the driving section 7 and downwardly of the loading platform 9. That is, this is a layout of the engine section 4 which does not have any hood for accommodating its engine section, with the lower side, lateral sides and most of the rear side thereof being open to the outside. Therefore, in comparison with a hood-accommodated type engine section, this engine section is to be placed under an environment where a large mount of dust or splashed mud or the like from the outside will be present.

In the work vehicle to be used under such conditions as described above, according to the present invention, the fuel tank 246, as illustrated in FIG. 19 and FIG. 20, is disposed into the space under the driver's seat 5, and the air cleaner 90 is disposed rearwardly of the engine 3 which is disposed rearwardly of the driver's seat 5 and downwardly of the loading platform 9. And, the pre cleaner 91 is provided at the leading end of an air intake pipe 90a which constitutes an air intake passage for introducing ambient air to the air cleaning 90, with the pre cleaner 91 being placed in opposition to the upper face side of the fuel tank 246.

As shown from FIG. 19 through FIG. 22, an ambient air inlet 91a of the pre cleaner 91 is disposed with downward orientation in opposition to the upper face of the fuel tank 246. That is, in its plan view, as shown in FIG. 19, the ambient air inlet 91a of the pre cleaner 91 in its almost entirety, is disposed in opposition to the upper face of the fuel tank 246 toward its rear end. In its rear view, the ambient air inlet 91a is disposed with the downward orientation in opposition to the upper face of the fuel tank 246, and an ambient air inlet gap (d) is formed between this ambient air inlet 91a and the upper face of the fuel tank 246.

At a position in the upper face of the fuel tank 246 corresponding to the vehicle body front side of the pre cleaner 91, the canister 247 incorporating absorbent such as activated carbon is attached so as to collect fuel evaporated inside the fuel tank 246.

This canister 247 is connected via its vapor inlet pipe 247a with the oil feed opening 246a of the fuel tank 246 and connected also via its vapor exhaust pipe 247b to a fuel gas feeding passage 90b from the air cleaner 90 to the engine 3. Further, an ambient inlet passage for introducing ambient air to the canister 247 is constituted by an ambient air inlet pipe 247c connected to a mid portion of an intake passage extending from the pre cleaner 91 to the air cleaner 90.

The vapor inlet pipe 247a connected to the oil feed opening 246a of the fuel tank 246 incorporates a two-way valve 92 at a mid position of the pipe. This two-way valve 92 is provided for switching over the flow direction of gas inside the vapor inlet pipe 247a to allow flow only in either one of the directions from the fuel tank 246 side to the canister 247 side and vice versa. In operation, based on detection result of a sensor (not shown) for detecting whether the engine 3 is in operation or not, the valve is switched over by a control device for effecting various control operations of the engine 3 such that the valve allows introduction of ambient air from the canister 247 side to the fuel tank 246 side, if it is detected that the engine is under operation; whereas, the valve allows introduction of evaporated fuel from the fuel tank 246 side to the canister 247 side, if it is detected that the engine is not under operation.

Figure 23:
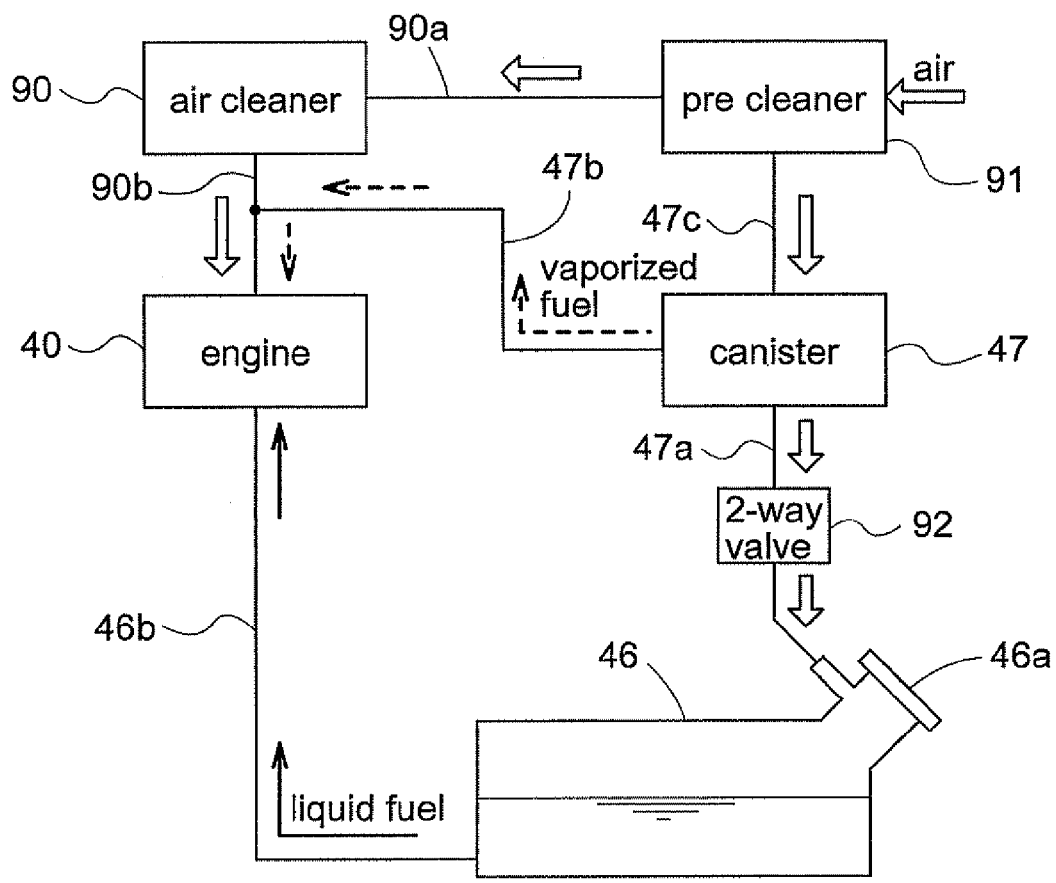
FIG. 23 is a block diagram showing flow of the fuel feeding line.
Figure 24:
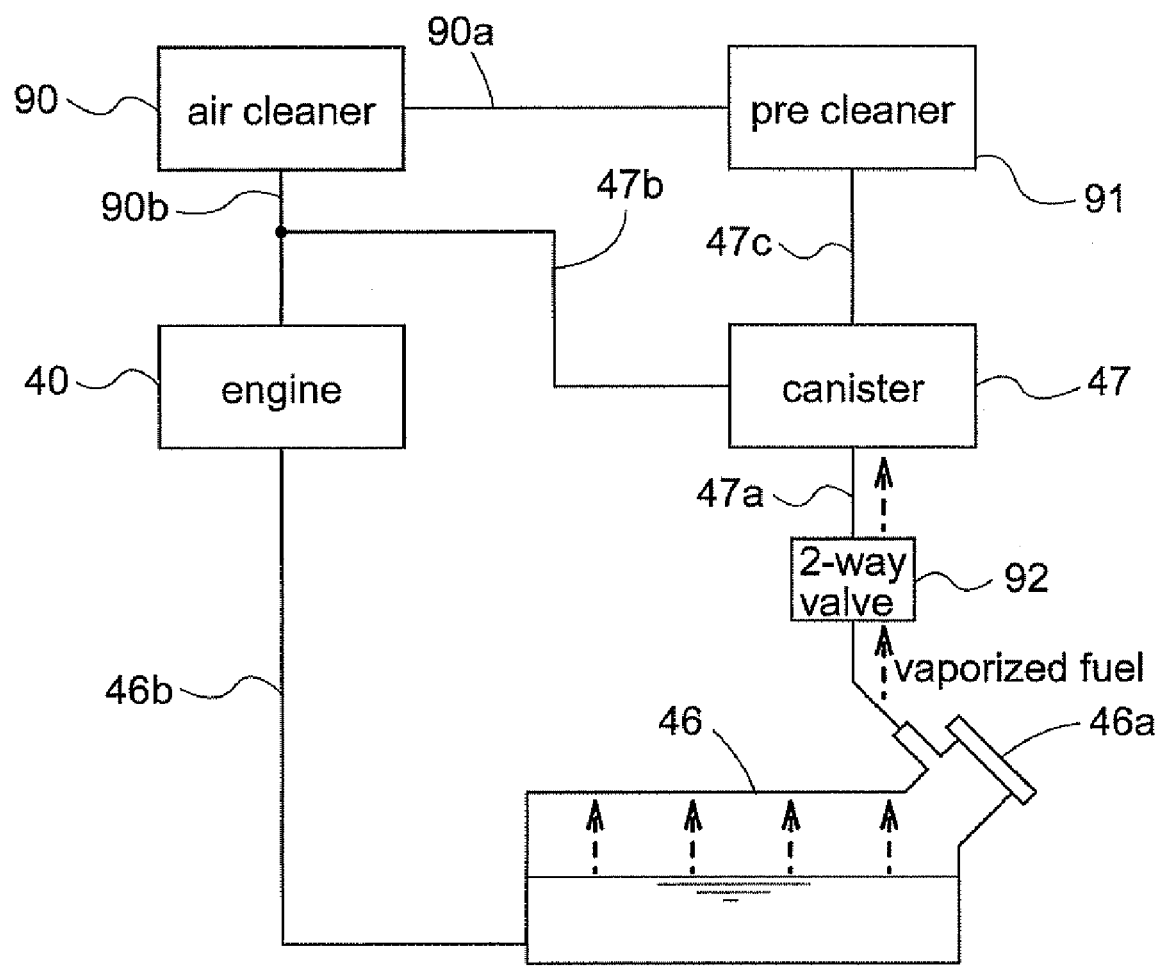
FIG. 24 is a block diagram showing the flow of the fuel feeding line.

FIG. 23 and FIG. 24 are block diagrams illustrating the flows of the ambient air and evaporated fuel in the fuel feed line. In these figures, the arrows in solid lines represent the flows of fuel (liquid), whereas the arrows in dotted lines represent the flows of the evaporated fuel, and also the arrows in outline typeface represent the flows of ambient air, respectively.

<During Engine Operation>

As shown in FIG. 24, fuel inside the fuel tank 246 is fed via a fuel pipe 246b to the engine 3.

And, in association with operation of the air cleaner 90, ambient air is fed via the pre cleaner 91 and the air cleaner 90 to the engine 3. In the course of this, a negative pressure developed in association with the supply of combustion gas from the air cleaner 90 to the engine 3, acts via the vapor exhaust pipe 247b. As a result, evaporated fuel substance (hydrocarbon, etc.) which has been collected within the canister 247 is sucked toward the engine 3 via the vapor exhaust pipe 247b and at the same time, ambient air is introduced from the pre cleaner 91 via the ambient air inlet pipe 247c.

Further, in the above situation, as the two-way valve 92 incorporated at a mid position of the vapor inlet pipe 247a connecting the canister 247 with the fuel tank 246 has been switched over to the condition for allowing the flow from the canister 247 side to the fuel tank 246 side, in response to lowering of the fuel liquid level with progressive consumption thereof inside the fuel tank 246, ambient air will flow from the canister 247 side to the fuel tank 246 side.

<During Non-Operation of Engine>

As shown in FIG. 24, when the engine 3 is stopped, the operation of a fuel injector (not shown) is also stopped. Therefore, the air cleaner 90 too is stopped, so that introduction of ambient air does not take place.

In the above, as the two-way valve 92 incorporated at a mid position of the vapor inlet pipe 247a connecting the canister 247 with the fuel tank 246 has been switched over to the condition for allowing the flow from the fuel tank 246 side to the canister 247 side to, evaporated fuel which has been evaporated during the stop of the engine 3 is guided to the canister 247 to be collected by its adsorbent.

Figure 25:
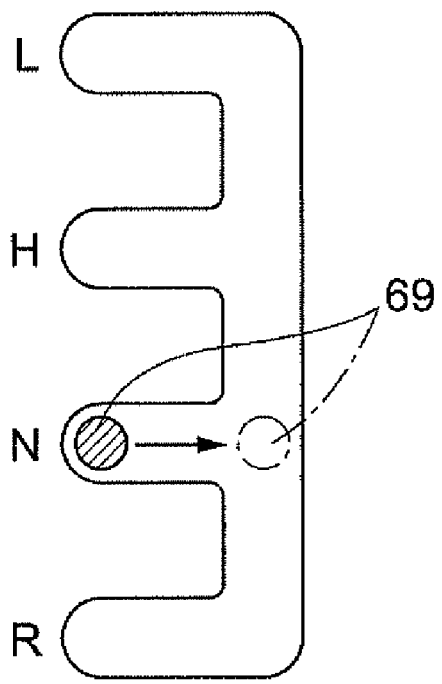
FIG. 25 is a construction diagram showing a further embodiment providing a throttle value in a return oil passage.

Other Embodiments (1) As the component used for operating the unload valve 64, instead of the brake operating member 42, the auxiliary speed change operating lever 69 as an auxiliary speed change operating member may be employed. In this case, as shown in FIG. 25, it is possible to adopt a construction wherein the unload valve 64 is switched over by a pivotal operation of the lever to the right/left side for shifting from the neutral position to a speed changed position. In this case, the auxiliary speed changing lever 69 constitutes a manual operating member.

(2) In the above, as the manual operating member, other speed changing lever than the auxiliary speed changing lever 69 may be employed. Or, a clutch operating member or the steering wheel per se may be employed as such. And, for switching over the unload valve 64, the mechanical coupling mechanism may be employed. But, it is also possible to electrically detect the movement of the manual operating member, and to operate the unload vale 64 by an actuator.

Figure 26:
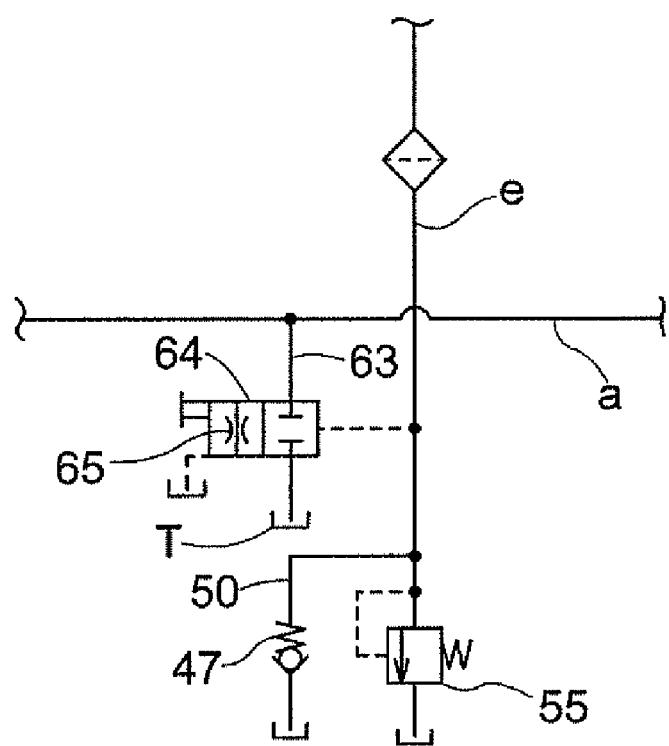
FIG. 26 is a plan view showing an operational construction of an auxiliary speed changing system.

(3) The disposing position of the throttle valve 65 may be inside the unload valve 64, as illustrated in FIG. 26.

(4) As the brake operating member 42, an operating lever type member can be employed, instead of the pedal type member.

(5) As an example of the work vehicle, the multi-purpose work vehicle has been described above. However, the invention may be applied to any other work vehicle such as an agricultural tractor.

The invention claimed is:

1. A work vehicle having a hydraulic stepless speed changing apparatus, comprising:
    a gear type speed changing apparatus receiving an output from the hydraulic stepless speed changing apparatus and converting it into a plurality of stages;
    a return oil passage connected to a high-pressure side circuit of the hydraulic stepless speed changing apparatus, the return oil passage being in communication with a hydraulic tank;
    an unload valve and a throttle valve which are incorporated in said return oil passage;
    a brake operating member for operating a brake; and
    an operably coupling mechanism for switching over said unload valve to an unloading condition, in response to an operational displacement of said brake operating member to its braking side, the operably coupling mechanism being provided between said unload valve and said brake operating member.

2. The work vehicle according to claim 1, wherein said unload valve includes a spool, which spool is displaceable between an unload position and a load position; and
    said operably coupling mechanism comprises a displacement transmitting mechanism having one end thereof operably coupled to said brake operating member and having the other end thereof operably coupled to said spool, said displacement transmitting mechanism converting an operational displacement of said brake operating member into a positional displacement of said spool.

3. The work vehicle according to claim 2, wherein said spool is inserted in a spool accommodating portion formed in a hydraulic port block for said hydraulic stepless speed changing apparatus.

4. The work vehicle according to claim 2, wherein said operably coupling mechanism comprises a release wire connected via a link mechanism to said brake operating member and said spool.

5. A work vehicle having a hydraulic stepless speed changing apparatus, comprising:
    a gear type speed changing apparatus receiving an output from the hydraulic stepless speed changing apparatus and converting it into a plurality of stages;
    a return oil passage connected to a high-pressure side circuit of the hydraulic stepless speed changing apparatus, the return oil passage being in communication with a hydraulic tank;
    an unload valve and a throttle valve which are incorporated in said return oil passage;
    a brake operating member for operating a brake;
    a manual operating member separate from said brake operating member; and
    an operably coupling mechanism for switching over said unload valve to an unloading condition, in response to an operational displacement of said manual operating member, the operably coupling mechanism being provided between said unload valve and said manual operating member.

6. The work vehicle according to claim 5 wherein said unload valve includes a spool, which spool is displaceable between an unload position and a load position; and
    said operably coupling mechanism comprises a displacement transmitting mechanism having one end thereof operably coupled to said manual operating member and having the other end thereof operably coupled to said spool said displacement transmitting mechanism converting an operational displacement of said manual operating member into a positional displacement of said spool.

7. The work vehicle according to claim 6, wherein said spool is inserted in a spool accommodating portion formed in a hydraulic port block for said hydraulic stepless speed changing apparatus.

8. The work vehicle according to claim 6, wherein said operably coupling mechanism comprises a release wire connected via a link mechanism to said manual operating member and said spool.

9. The work vehicle according to claim 5, wherein said manual operating member comprises an auxiliary speed change operating member.

* * * * *